(12) United States Patent
Toyama

(10) Patent No.: US 7,756,294 B2
(45) Date of Patent: Jul. 13, 2010

(54) MACHINE VISION SYSTEM AND METHOD FOR ESTIMATING AND TRACKING FACIAL POSE

(75) Inventor: Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1103 days.

(21) Appl. No.: 11/382,012

(22) Filed: May 5, 2006

(65) Prior Publication Data

US 2006/0193494 A1 Aug. 31, 2006

Related U.S. Application Data

(60) Continuation of application No. 11/106,862, filed on Apr. 16, 2005, now Pat. No. 7,046,825, which is a division of application No. 09/683,448, filed on Dec. 31, 2001, now Pat. No. 6,937,745.

(51) Int. Cl.
*G06K 9/00* (2006.01)

(52) U.S. Cl. ...................................... 382/103; 382/118

(58) Field of Classification Search ................. 382/103, 382/118; 345/158
See application file for complete search history.

(56) References Cited

U.S. PATENT DOCUMENTS 6,215,471 B1 * 4/2001 DeLuca ...................... 345/158

* cited by examiner

*Primary Examiner*—Brian P Werner
(74) *Attorney, Agent, or Firm*—Lyon & Harr, L.L.P.; Craig S. Fischer

(57) ABSTRACT

System and method for estimating and tracking an orientation of a user's face by combining head tracking and face detection techniques. The orientation of the face, or facial pose, can be expressed in terms of pitch, roll and yaw of the user's head. Facial pose information can be used, for example, to ascertain in which direction the user is looking. In general, the facial pose estimation method obtains a position of the head and a position of the face and compares the two to obtain the facial pose. In particular, a camera is used to obtain an image containing a user's head. Any movement of the user's head is tracked and the head position is determined. A face then is detected on the head and the face position is determined. The head and face positions then are compared.

20 Claims, 20 Drawing Sheets

MACHINE VISION SYSTEM AND METHOD FOR ESTIMATING AND TRACKING FACIAL POSE

CROSS REFERENCE TO RELATED APPLICATIONS

This application is a continuation application of U.S. Ser. No. 11/106,862, filed on Apr. 16, 2005, now U.S. Pat. No. 7,046,825, entitled "Machine Vision System and Method for Estimating and Tracking Facial Pose," which is a divisional application of U.S. Ser. No. 09/683,448, filed on Dec. 31, 2001, now U.S. Pat. No. 6,937,745, entitled "Machine Vision System and Method for Estimating and Tracking Facial Pose," issued Aug. 30, 2005, whereby the entire contents of each of these documents is hereby incorporated by reference.

BACKGROUND

Traditional interaction between a user and a computer occurs with the computer waiting passively for the user to dictate its actions. Through input devices, such as a keyboard and a mouse, the user communicates actions and intentions to the computer. Although this one-sided interaction is common it fails to fully exploit the capabilities of the computer.

It is desirable to have the computer play a more active role in interacting with the user rather than merely acting as a passive information source. A more interactive design involves linking the computer to a video camera so that the computer can interact with the user. The computer achieves this interaction by detecting the presence of and tracking the user. The user's face in particular provides important indications of where the user's attention is focused. Once the computer is aware of where the user's is looking this information can be used to determine the user's actions and intentions and react accordingly.

An important way in which a computer determines where a user's attention is focused by determining the facial pose of the user. A facial pose is the orientation of the user's face. The facial pose can be described in terms of rotation about three axes, namely, pitch, roll and yaw. Typically, the pitch is the movement of the head up and down, the yaw is the movement of the head left and right, and the roll is the movement of the head from side to side.

Determining a user's facial pose in real time, however, presents many challenges. First, the user's head must be detected and tracked to determine the location of the head. One problem with current real-time head tracking techniques, however, is that these techniques often are confused by waving hands or changing illumination. In addition, techniques that track only faces do not run at realistic camera frame rates or do not succeed in real-world environments. Moreover, head tracking techniques that use visual processing modalities may work well in certain situations but fail in others, depending on the nature of the scene being processed. Current visual modalities, used singularly, are not discriminating enough to detect and track a head robustly. Color, for example, changes with shifts in illumination, and people move in different ways. In contrast, "skin color" is not restricted to skin, nor are people the only moving objects in the scene being analyzed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The facial pose estimation system and method disclosed herein includes providing real-time tracking of and information about a user's facial pose. The facial pose of the user is a position and orientation in space of the user's face and can be expressed in terms of pitch, roll and yaw of the user's head. Facial pose information can be used, for example, to ascertain in which direction the user is looking and consequently where the user's attention is focused.

The facial pose estimation system and method of the present invention provides at least one advantage over existing techniques. In particular, the facial pose of a user can be synthesized from any combination of: (1) a head-tracking component; and (2) a frontal face-detecting component. The method of the present invention includes using a camera to obtain an image containing a user's head. Next, any movement of the user's head is tracked and a position of the user's head is determined. A face then is detected on the head and a face position is determined. The head and face positions are then compared to each other to obtain the facial pose.

The comparison of the head and face positions may be achieved by using one of at least two techniques. A first technique involves determining a center of the user's head and constructing a head line between the head center and the center of the camera. Next, a face on the head is detected and the center of the face is computed. A face line is constructed between the camera center and the face center. A deviation angle is defined as the angle between the head line and the face line. By comparing the deviation angle to a threshold angle, the facial pose can be determined. Alternatively, instead of finding the center of the head and the center of the face, the centroid of the head and the centroid of the face may be found and used.

Another technique for comparing the head and face positions involves obtaining an image containing the user's head and face and finding the face center. A center line is defined as a line that bisects the user's head into two equal parts. The distance in pixels between the face center and the center line is found and compared to a threshold value. The facial pose can be determined by the amount of divergence. In addition, if there is divergence of more than the threshold value, then it may be assumed that the user's attention is not focused on a particular monitor. On the other hand, if the divergence is less that the threshold value, then it may be assumed that the user's attention is focused on the monitor.

The system of the present invention utilizes a combination of a head-tracking component in the form of a head tracker, and a frontal face detecting component in the form of a face detection system. The head tracker is used to detect and track a user's head and to determine the position and center of the head. The face detection system is used to detect a face on the head and to determine the position and center of the face. A position comparator compares the head position and the face position in accordance with the above method to synthesize the user's facial pose.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

Figure 1:
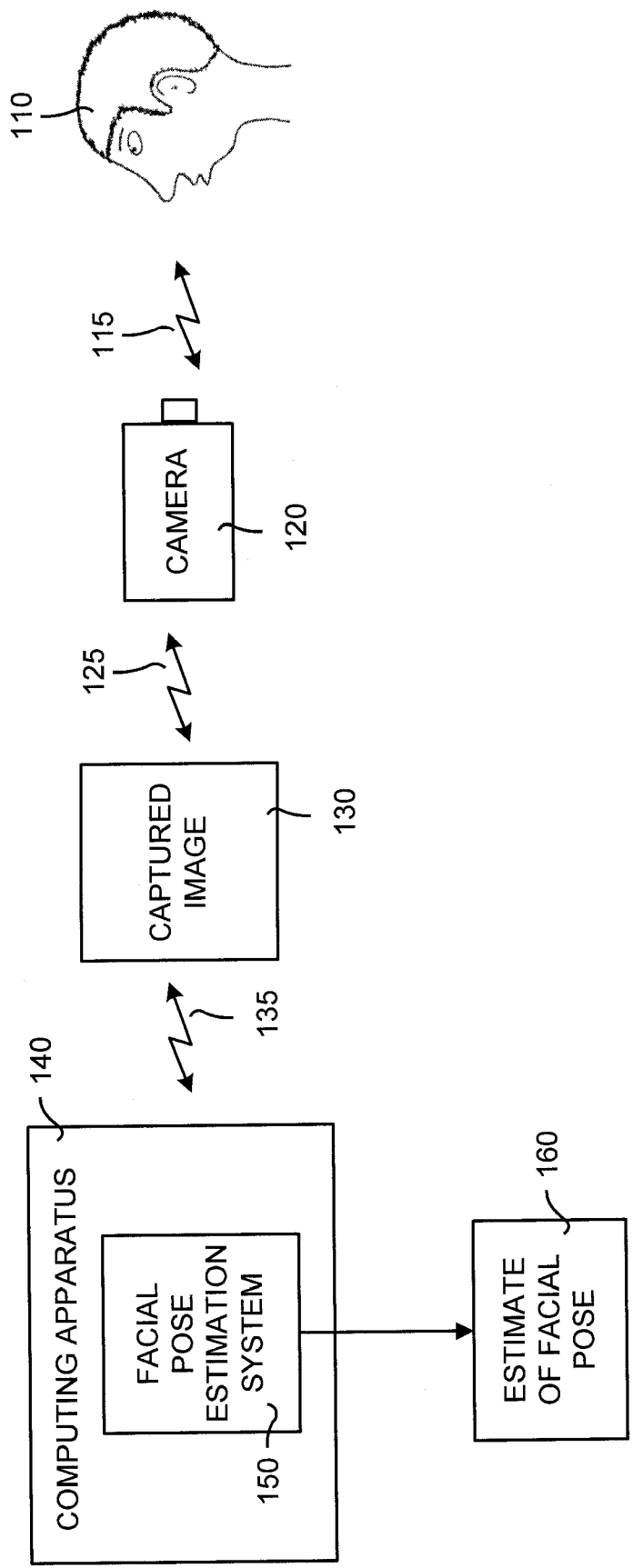
FIG. 1 is a block diagram illustrating an overview of the facial pose estimation system of the present invention.

In the following description of the facial pose estimation system and method, reference is made to the accompanying drawings, which form a part thereof, and in which is shown by way of illustration a specific example whereby the facial pose estimation system and method may be practiced. It is to be understood that other embodiments may be utilized and structural changes may be made without departing from the scope of the claimed subject matter.

I. General Overview

The present invention includes a facial pose estimation system and method for estimating and tracking an orientation of a user's face (also called a facial pose). Information about where the user's attention is focused may be synthesized from the user's facial pose. This important information about where the user's attention is focused may be used in varied and diverse ways. For example, a screen saver can be controlled by the present invention, such that the screen saver starts when the user is not looking at a monitor and stops when the user is looking at the monitor. The present invention also may be used in a multiple-monitor environment to determine at which monitor the user is looking. In this situation a monitor application running on the computer can use the present invention to determine which monitor the user is observing so that information may be presented to the user.

Another way in which the present invention may be used is to make available the user's state to others. For example, instant messaging applications can use the present invention to provide a more accurate indication of whether the user is present at his computer and available to see the message. Using the present invention, a computer could determine which computation to perform at the present time based on whether the user is looking at the monitor. For example, if the user is focused somewhere other than the monitor the computer could perform background computation. The present invention also may be used by an audio application to determine whether to run speech recognition on an audio signal from a microphone. Thus, if the user is facing the monitor and speaking the speech recognition is performed. On the other hand, if the user is turned away from the monitor speech recognition ceases. Similarly, lip reading applications may use the present invention notify the application to read the user's lips when the user is facing the monitor and cease when the user is turned away.

The facial pose estimation system determines facial pose information using a combination of a head tracker and a face detector. The head tracker provides information about the position in space of the user's head. In addition, the head tracker is used to track any movement of the user's head. Once the user's head has been tracked and its position found the face detector is used to detect a face on the head. If a face is detected, then the position of the face in space is determined. A facial pose, or the orientation of the face in space, can be estimated by comparing the head position and the face position. This facial pose information can provide vital information about the user, such as where a user's attention is focused.

FIG. 1 is a block diagram illustrating an overview of the facial pose estimation system of the present invention. The system is used to track and estimate a facial pose of a head 110. Although the head usually will be a human head, other situations are possible. By way of example, the head 110 may be a robotic head that is crafted to approximate the look of a human head. The head 110 usually includes such facial features as two eyes, a nose and a mouth, but other facial features such as facial hair are possible.

A camera 120 is used to capture visual information 115. In one aspect of the invention, the camera 120 captures visual information 115 about the head 110 in real time. In another aspect of the invention, the head 110 is contained in an image or series of images (such as a photograph or video sequence) and the camera 120 captures visual information 115 from the images. The camera 120 outputs 125 a captured image 130 that contains the visual information 115 about the head 110.

The captured image 130 is transmitted 135 to a computing apparatus 140 containing a facial pose estimation system 150. The computing apparatus 140 may be any device that contains a processor and is capable of executing computer-readable instructions. In one aspect of the invention the facial pose estimation system 150 is a software module containing computer executable instructions. As described in detail below, the facial pose estimation system 150 tracks and processes the image 130 in real time. In addition, the system 150 provides an estimate of the facial pose 160 of the head 110.

Figure 2A:
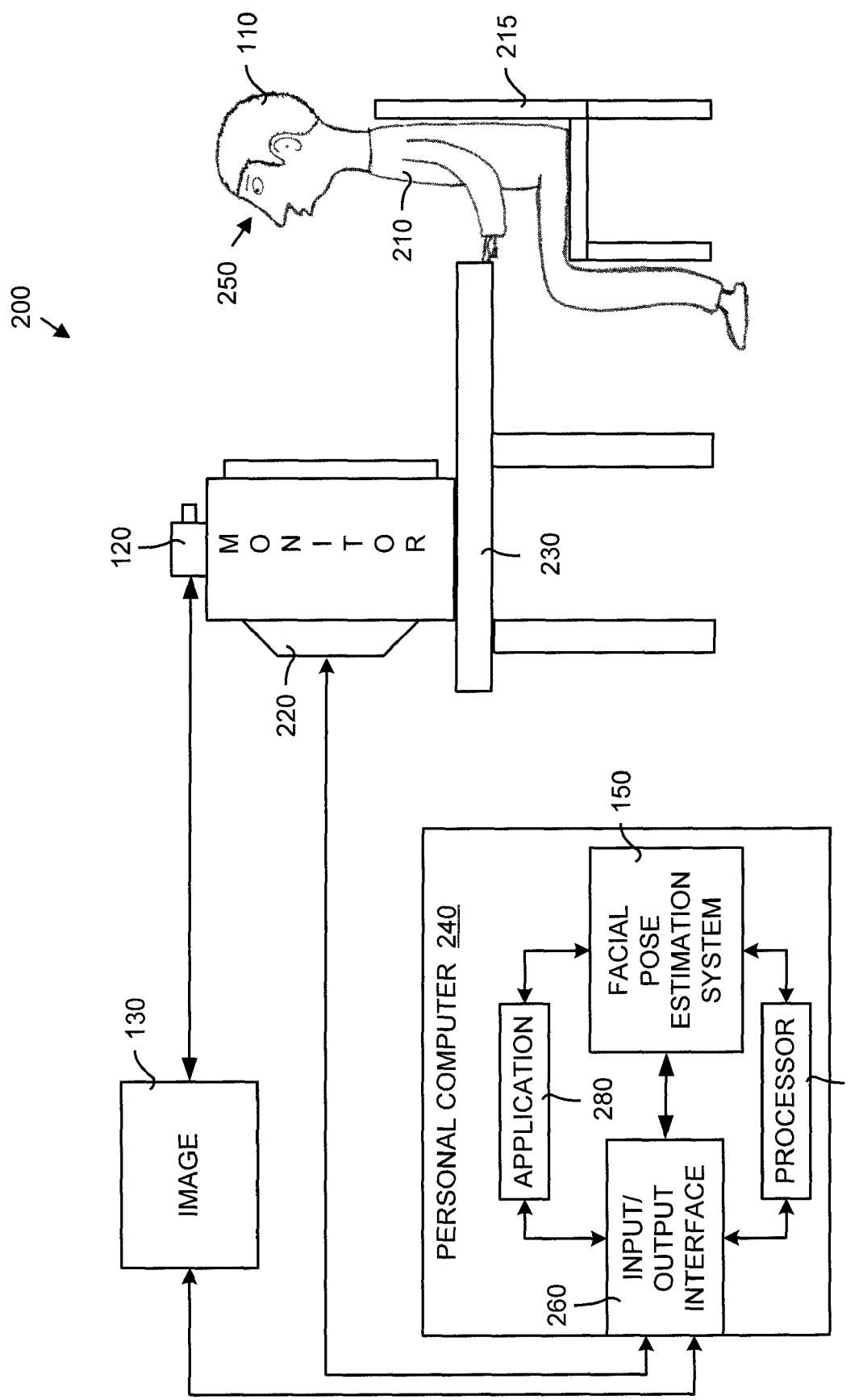
FIG. 2A is an illustration of one possible implementation of the facial pose estimation system shown in FIG. 1 where a user is looking at a monitor.
Figure 2B:
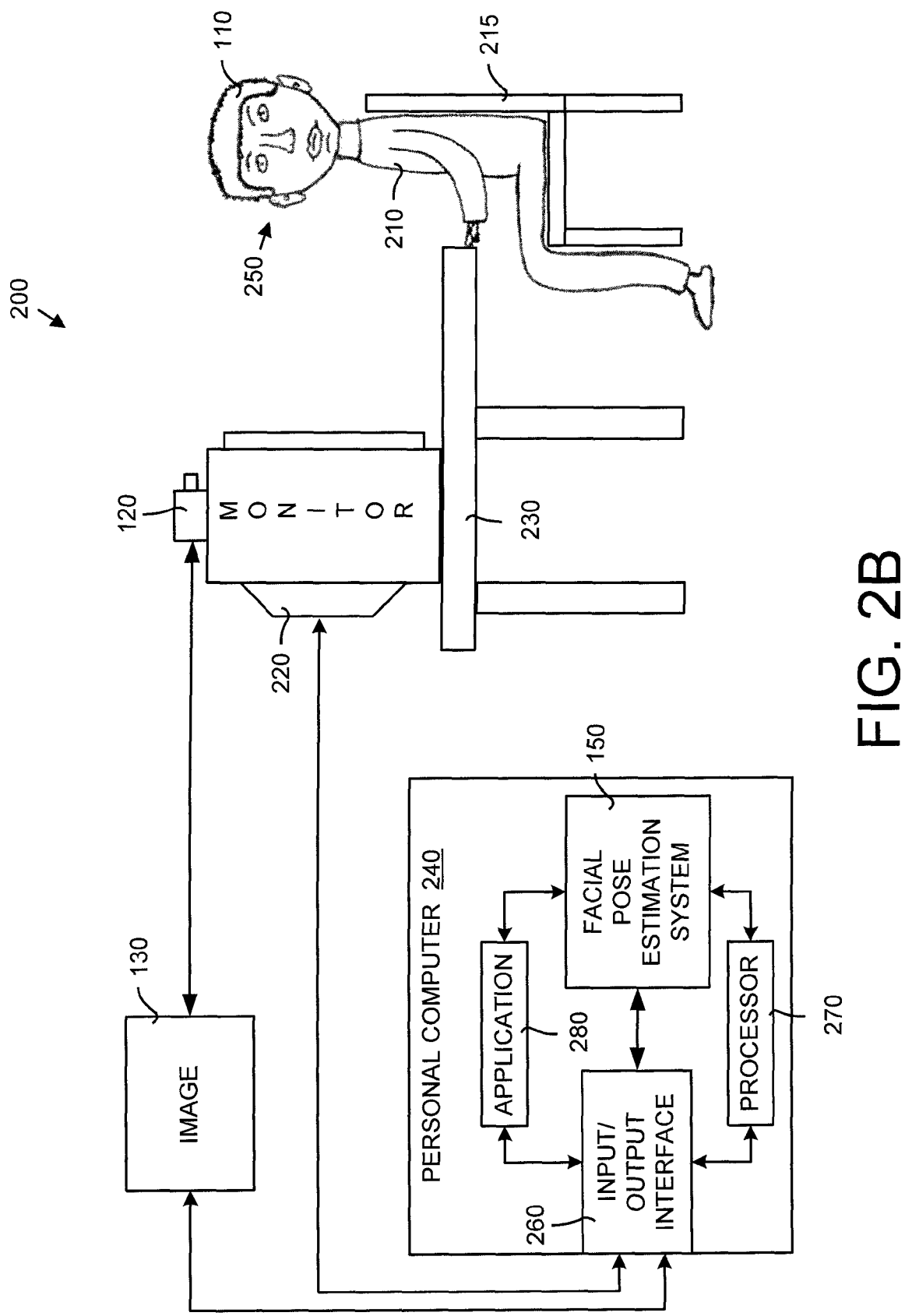
FIG. 2B is an illustration of one possible implementation of the facial pose estimation system shown in FIG. 2A where a user is looking away from the monitor.

FIGS. 2A and 2B illustrate one type of implementation of the facial pose estimation system 150 of the present invention. In this implementation, the facial pose estimation system 150 is implemented into an attention detection system 200. The attention detection system 200 is used to synthesize information about where a user's attention is focused. In this implementation, the camera 120 is located on a monitor 220 and the facial pose estimation system 150 is used to determine whether a user 210 is looking at (or paying attention to) the monitor 220. It should be noted that several other implementations are possible and FIGS. 2A and 2B illustrate only a single possible implementation.

Referring to FIG. 2A, the facial pose estimation system 150 is implemented in an attention detection system 200. The attention detection system 200 includes the user 210 sitting in a chair 215 and observing the monitor 220 that is located on a table 230. The monitor 220 provides information to the user 210 and serves as an interface between a personal computer 240 and the user 210.

The facial pose estimation system 150 includes the camera 120 that is located on the monitor 220. At this location, the camera 120 is capable of observing the user 210, especially the head 110 and face 250 of the user 210. The camera 120 captures visual information 115 of the user 210 and transmits the image 130 to the personal computer 240 for processing. The personal computer 240 includes an input/output interface 260 for allowing devices to be connected to the personal computer 240. The camera 120 and the monitor 220 are connected to the personal computer via the input/output interface 260. At least one processor 270 is located on the personal computer 240 to provide processing capability. The facial pose estimation system 150 and at least one application 280 also are located on the personal computer 240.

The facial pose estimation system 150 provides facial pose information to the attention detection system 200 as follows. The user 210 uses the personal computer 240 by sitting in the chair 215 and facing the monitor 220. The camera 120 captures at least the head 110 of the user 210 and sends the image 130 of the head 110 to the facial pose estimation system 150. The facial pose estimation system 150 receives the image 130 through the input/output interface 260 and processes the image 130 using the processor 270. The facial pose estimation system 150 determines facial pose information in real time and makes the information available to the application 280.

In this implementation the application 280 uses the facial pose information to determine whether the user's 210 attention is focused on the monitor 220. In other words, whether the user 210 is observing the monitor 220. Depending on the type of application, this facial pose information allows the application 280 to determine a good time perform an action. By way of example, if the application 280 is an e-mail application then the application will to notify the user 210 that he has an e-mail when the facial pose estimation system 150 determines that the user 210 is facing the monitor 220.

As shown in FIG. 2A, the user 210 is facing the monitor 220. In this example, the facial pose estimation system 150 provides this information to the application 280 and the application 280 then sends an e-mail notification message to the monitor 220 knowing that the user 210 is looking at the monitor and will likely see the message.

On the other hand, in FIG. 2B the user 210 is not facing the monitor (because the face 250 of the user 210 is looking away from the monitor 220). In this situation the facial pose estimation system 150 determines that the facial pose of the user 210 is away from the monitor 220. This facial pose information is reported to the application 280. Using the above example, the application 280 uses this information and does not send an e-mail notification message to the monitor 220 because the user 210 most likely will not see the message. Instead the application 280 waits until the user 210 is facing the monitor 220 to send the message.

II. Exemplary Operating Environment

The facial pose estimation system 150 of the present invention is designed to operate in a computing environment. In FIG. 1, the computing environment includes a computing apparatus 140 and in FIGS. 2A and 2B the computing environment includes a personal computer 240. The follow discussion is intended to provide a brief, general description of a suitable computing environment in which the invention may be implemented.

Figure 3:
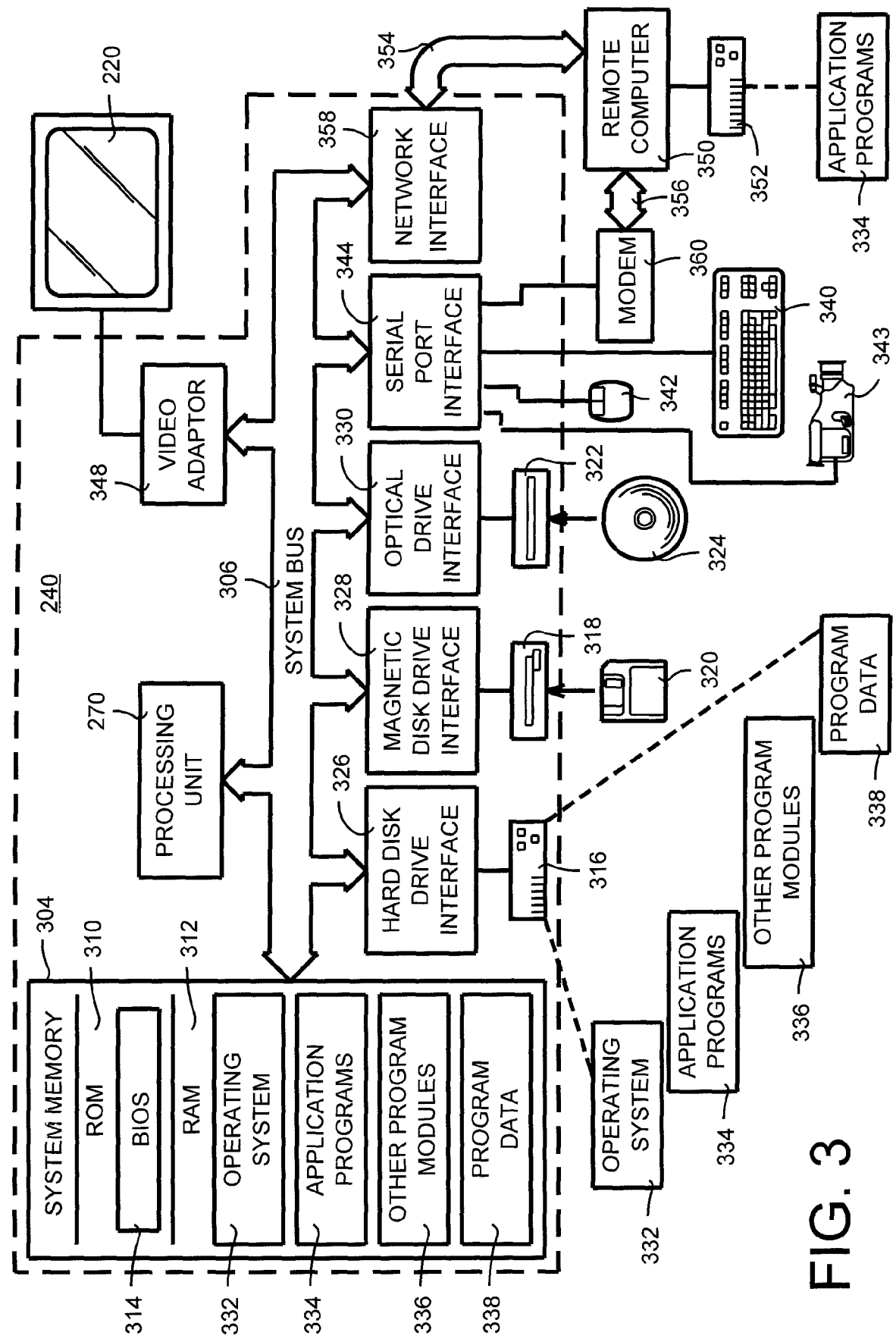
FIG. 3 is a block diagram illustrating a computing apparatus suitable for carrying out the invention.

FIG. 3 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 3, an exemplary system for implementing the invention includes a general-purpose computing device in the form of the conventional personal computer 240 shown in FIGS. 2A and 2B. FIG. 3 illustrates details of the computer 240. In particular, the computer 240 includes the processing unit 270, a system memory 304, and a system bus 306 that couples various system components including the system memory 304 to the processing unit 270. The system bus 306 may be any of several types of bus structures including a memory bus or memory controller, a peripheral bus, and a local bus using any of a variety of bus architectures. The system memory includes read only memory (ROM) 310 and random access memory (RAM) 312. A basic input/output system (BIOS) 314, containing the basic routines that help to transfer information between elements within the personal computer 240, such as during start-up, is stored in ROM 310. The personal computer 240 further includes a hard disk drive 316 for reading from and writing to a hard disk, not shown, a magnetic disk drive 318 for reading from or writing to a removable magnetic disk 320, and an optical disk drive 322 for reading from or writing to a removable optical disk 324 such as a CD-ROM or other optical media. The hard disk drive 316, magnetic disk drive 328 and optical disk drive 322 are connected to the system bus 306 by a hard disk drive interface 326, a magnetic disk drive interface 328 and an optical disk drive interface 330, respectively. The drives and their associated computer-readable media provide nonvolatile storage of computer readable instructions, data structures, program modules and other data for the personal computer 240.

Although the exemplary environment described herein employs a hard disk, a removable magnetic disk 320 and a removable optical disk 324, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 320, optical disk 324, ROM 310 or RAM 312, including an operating system 332, one or more application programs 334, other program modules 336 (such as the facial pose estimation system 150) and program data 338. A user (not shown) may enter commands and information into the personal computer 240 through input devices such as a keyboard 340 and a pointing device 342. In addition, a camera 343 (such as a video camera) may be connected to the personal computer 240 as well as other input devices (not shown) including, for example, a microphone, joystick, game pad, satellite dish, scanner, or the like. These other input devices are often connected to the processing unit 270 through a serial port interface 344 that is coupled to the system bus 306, but may be connected by other interfaces, such as a parallel port, a game port or a universal serial bus (USB). The monitor 220 (or other type of display device) is also connected to the system bus 306 via an interface, such as a video adapter 348. In addition to the monitor 346, personal computers typically include other peripheral output devices (not shown), such as speakers and printers.

The personal computer 240 may operate in a networked environment using logical connections to one or more remote computers, such as a remote computer 350. The remote computer 350 may be another personal computer, a server, a router, a network PC, a peer device or other common network node, and typically includes many or all of the elements described above relative to the personal computer 240, although only a memory storage device 352 has been illustrated in FIG. 3. The logical connections depicted in FIG. 3 include a local area network (LAN) 354 and a wide area network (WAN) 356. Such networking environments are commonplace in offices, enterprise-wide computer networks, intranets and the Internet.

When used in a LAN networking environment, the personal computer 240 is connected to the local network 354 through a network interface or adapter 358. When used in a WAN networking environment, the personal computer 240 typically includes a modem 360 or other means for establishing communications over the wide area network 356, such as the Internet. The modem 360, which may be internal or external, is connected to the system bus 306 via the serial port interface 344. In a networked environment, program modules depicted relative to the personal computer 240, or portions thereof, may be stored in the remote memory storage device 352. It will be appreciated that the network connections shown are exemplary and other means of establishing a communications link between the computers may be used.

III. Operational and System Overview

Figure 4:
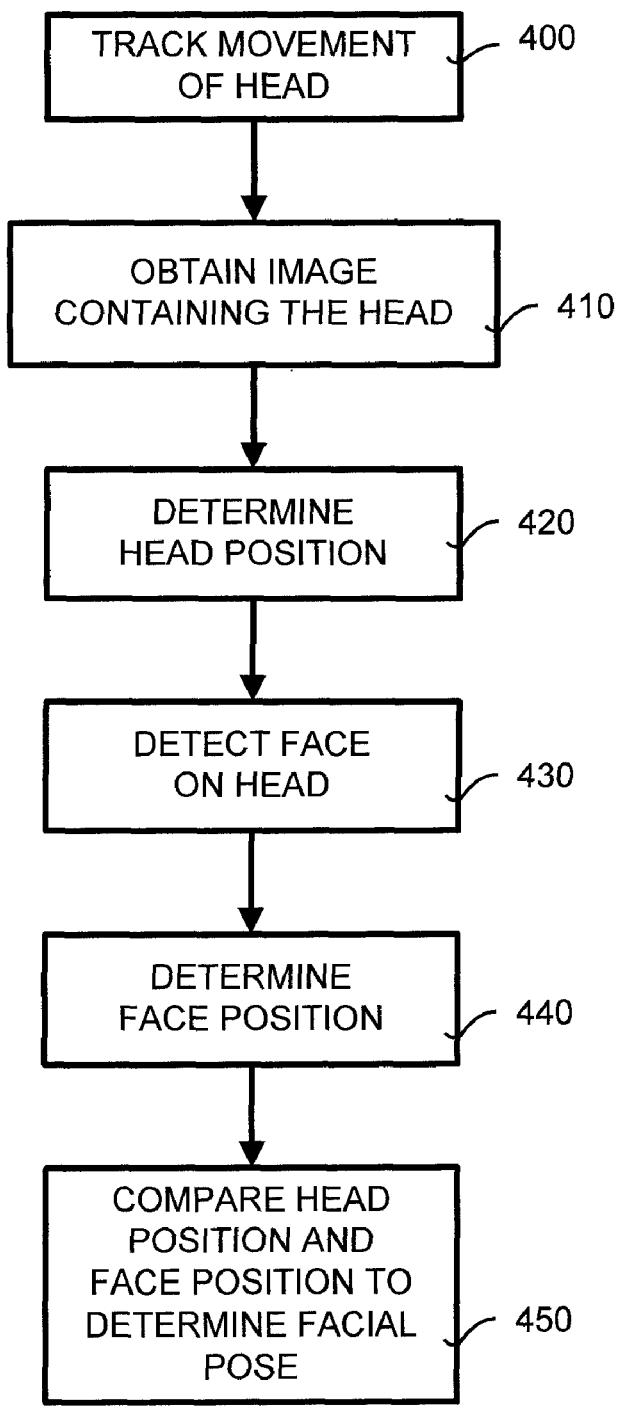
FIG. 4 is a general flow diagram illustrating the operation of the facial pose estimation system shown in FIGS. 1, 2A and 2B.

FIG. 4 is a general flow diagram illustrating the operation of the facial pose estimation system 150 shown in FIGS. 1, 2A and 2B. In general, the system 150 analyzes a user's head and face and determines the direction that the user is facing. Specifically, the system 150 first tracks any movement of the head within the range of a camera (box 400). This head tracking ensures that the system 150 will be analyzing the head. Any one of several head tracking techniques may be used with the present invention. One head tracking technique using multiple sensing modalities was used in the working example below and is described in detail in Appendix "A".

Using the camera, the system 150 obtains an image containing the head (box 410). From this image a position of the head is determined (box 420). The position of the head may be expressed is several different ways, such as relative to a point in space or a point on an object. By way of example, the head position may be expressed relative to the center of the camera.

Once the head position is established the system 150 performs face detection to detect a face on the head (box 430). If a face is detected on the head then the position of the face is determined (box 440). Any of several face detection techniques may be used with the present invention. A face detection technique using a relational template and a non-intensity image property was used in the working example below and is described in detail in Appendix "B".

As with the head position, the face position may be expressed in a variety of ways, such as relative to the camera center. Next, the head position and the face position are compared to each other to determine a facial pose (box 450). The facial pose gives indications as to the direction that the user's face is pointing.

Figure 5A:
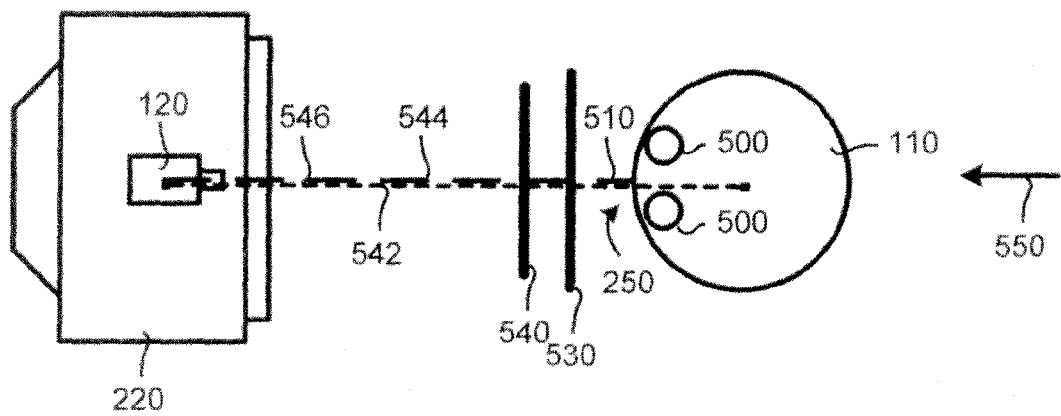
FIGS. 5A, 5B and 5C are general block diagrams illustrating how the head and face positions may be compared to each other.
Figure 5B:
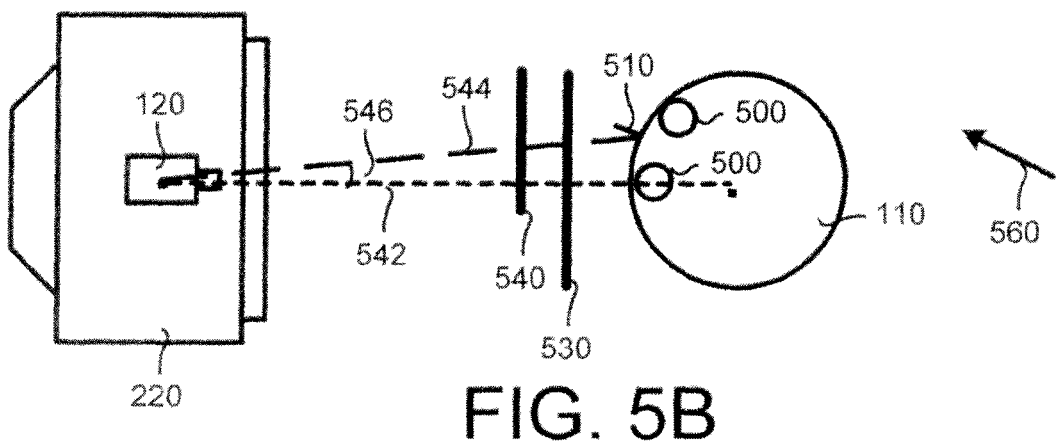
Figure 5C:
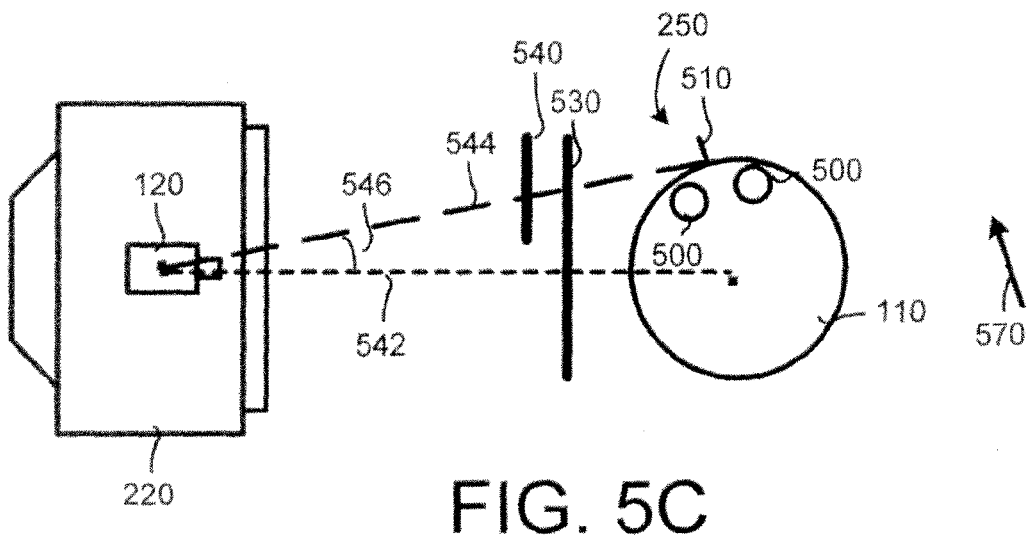

FIGS. 5A, 5B and 5C are general block diagrams illustrating how the head and face positions may be compared to each other to determine the facial pose. FIGS. 5A, 5B and 5C represent a plan view of the facial pose estimation system 150 and the attention detection system 200 shown in FIGS. 2A and 2B. FIGS. 5A, 5B and 5C illustrate the user's head 110 and part of the user's face. The face 250 is represented by a pair of eyes 500 and a nose 510. The head 110 and face 250 are captured by the camera 120 that is mounted on the monitor 220.

The facial pose estimation system 150 determines a facial pose by comparing a head position and a face position. The head position is represented in FIGS. 5A, 5B and 5C by a head position bar 530. The head position bar 530 represents the portion of the camera view that the system 150 recognizes as the head 110. Likewise, the position of the face 250 is represented by a face position bar 540. The face position bar 540 represents the portion of the camera view that the system 150 recognizes as the face 250.

The head position bar 530 is bisected by head position bar line 542 that is an imaginary line (shown as a short dashed line in FIGS. 5A, 5B and 5C) from the center of the camera 120 through the center of the head position bar 530. Similarly, the face position bar 540 is bisected by a face position bar line 544 (shown as a long dashed line in FIGS. 5A, 5B and 5C) from the center of the camera 120 through the center of the face position bar 540.

The facial pose estimation system 150 determines facial pose by comparing the angle 546 between the head position bar line 542 and the face position bar line 544. By determining the angle between the position bar lines 542, 544, the system 150 can estimate the direction the user's face 250 is pointed and thus the facial pose.

Referring to FIG. 5A, the user's face 250 is facing in the direction of the monitor 220. The facial pose estimation system 150 determines this by noting that that the head position bar line 542 and the face position bar line 544 are lined up with each other and at little or no angle. In this situation as shown in FIG. 5A, the user's face 250 is looking forward toward the camera 120 and monitor 220. A first arrow 550 shows the direction that the user's face 250 is looking.

In FIG. 5B, the angle 546 between the head position bar line 542 and the face position bar line 540 is larger than in FIG. 5A. This means that the user's face 250 is pointed slightly away from the camera 120 and monitor 220. A second arrow 560 shown that the user's face 250 is looking slight away from the camera 120 and monitor. As discussed in detail below, in some implementations of the invention the angle 546 is compared to a certain threshold angle. If the angle 546 is greater than the threshold angle, then the user's face 250 is considered pointed away from the camera 120 and monitor 220. On the other hand, if the angle 546 is smaller that the threshold angle, then the user's face 250 is considered pointed toward the camera 120 and monitor.

In FIG. 5C, the angle 546 between the head position bar line 542 and the face position bar line 5404 is larger than in FIGS. 5A and 5B. In this case, the facial estimation system 150 determines that the user's face 250 is facing away from the camera 120 and monitor. The direction in which the user's face 250 is pointing is shown by the third arrow 570.

The determination that the user is looking at the monitor if the facial pose is within the threshold angle may involve one or more techniques. By way of example, probability may be used. A Gaussian probability curve may be used to show that if a user's facial pose is within a threshold angle then there is a high probability that the user is looking at the monitor. Conversely, if the user's facial pose is greater than the threshold angle there is a high probability that the user is not looking at the monitor. Eye tracking may also be used to determine whether a user is looking at the monitor. Eye tracking involves tracking the user's eyes to determine where the user is looking. Typically, eye tracking would be used when the facial pose is less than the threshold angle.

Figure 6:
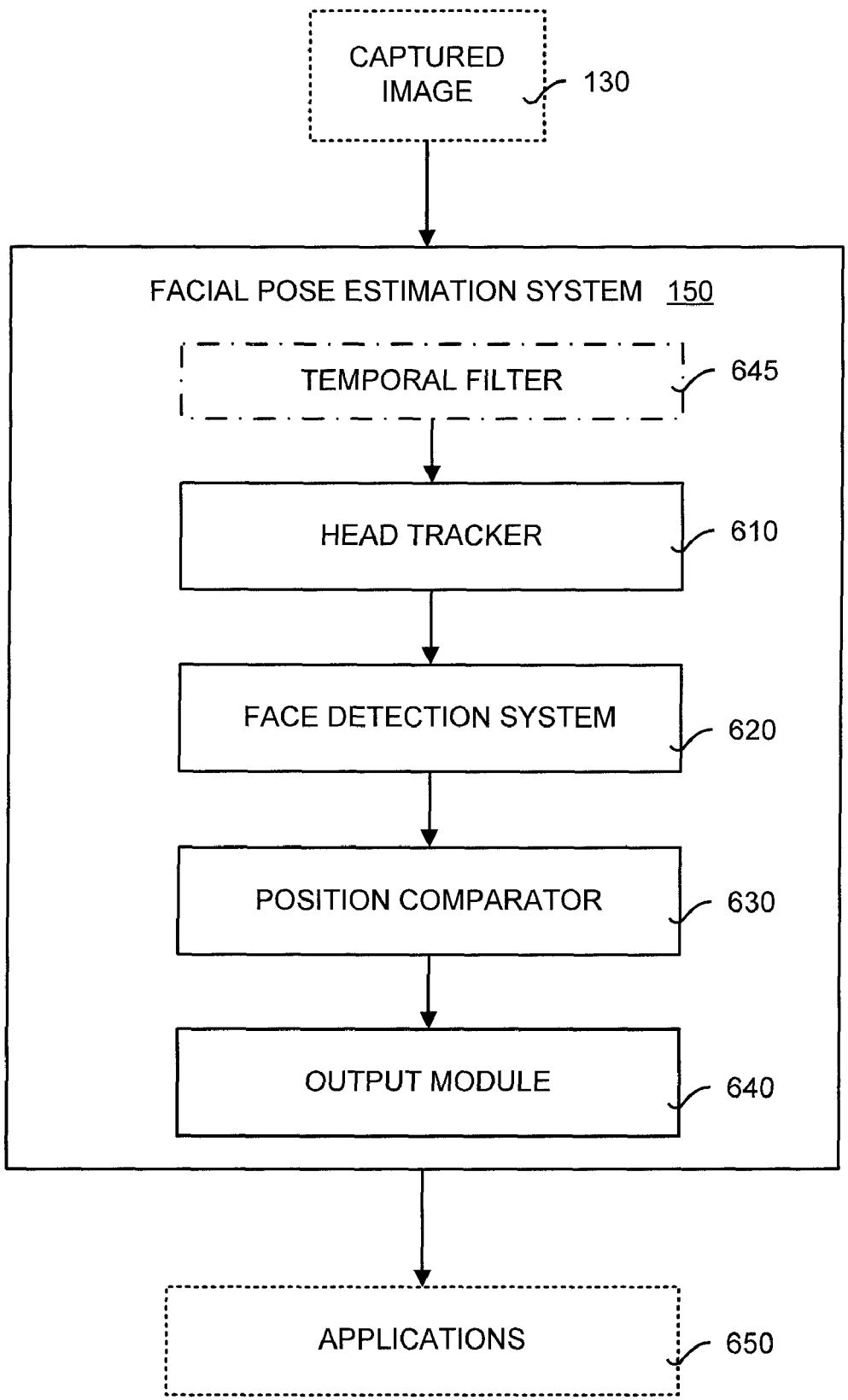
FIG. 6 is a block diagram illustrating the components of the facial pose estimation system shown in FIGS. 1, 2A and 2B.

FIG. 6 is a block diagram illustrating the components of the facial pose estimation system 150 shown in FIGS. 1, 2A and 2B. The facial pose estimation system 150 includes a head tracker 610, a face detection system 620, a position comparator 630, and an output module 640. The facial pose estimation system 150 may also include an optional temporal filter 645 for filtering out any sudden and temporary movements of the user's face. For example, a temporal filter may be used to filter out the facial movement when the user's looks away for a brief moment to get a pen. This optional temporal filter is shown in FIG. 6 as optional by the alternating dotted and dashed line.

The image 130 is obtained (such as by using a camera) and then transmitted to the system 150 for processing. The head tracker 610 tracks a head within the image 130 and determines a position of the head relative to a certain point. In most cases the head position will be determined relative to the center of the camera 120.

Once the head position is determined, the face detection system 620 determines whether the head has a face. If so, then the face detection system 620 determines the position of the face relative to certain point, such as the center of the camera 120. The position comparator 630 receives the head and face position and, as outlined above and detailed below, determines the facial pose by comparing the head and face positions. Facial pose information is synthesized using this comparison and this information is sent to the output module 640 for distribution to one or more applications 650.

IV. Operational Details and Working Example

The following working example is used to illustrate the operational details of the invention. This working example includes the implementation of FIGS. 2A and 2B in which the facial pose estimation system 150 is incorporated into the attention detection system 200. This working example is provided as an example of one way in which facial pose estimation system may operate and be used. It should be noted that this working example is only one way in which the invention may operate and be used, and is provided for illustrative purposes only.

The comparison of the head and face positions may be achieved by using one of at least two techniques. The working example presented uses a first technique outlined above that involves determining a center of the user's head and constructing a head line between the head center and the center of the camera. Next, a face on the head is detected and the center of the face is computed. A face line is constructed between the camera center and the face center. A deviation angle is defined as the angle between the head line and the face line. By comparing the deviation angle to a threshold angle, the facial pose can be determined.

Another aspect of the present invention includes a comparison technique that involves obtaining an image containing the user's head and face and finding the face center. A center line is defined as a line that bisects the user's head into two equal parts. The distance in pixels between the face center and the center line is found and compared to a threshold value. The facial pose can be determined by the amount of divergence. In addition, if there is divergence of more than the threshold value, then it may be assumed that the user is not looking at the monitor in front of him. On the other hand, if the divergence is less that the threshold value, then it may be assumed that the user is looking at the monitor.

Figure 7:
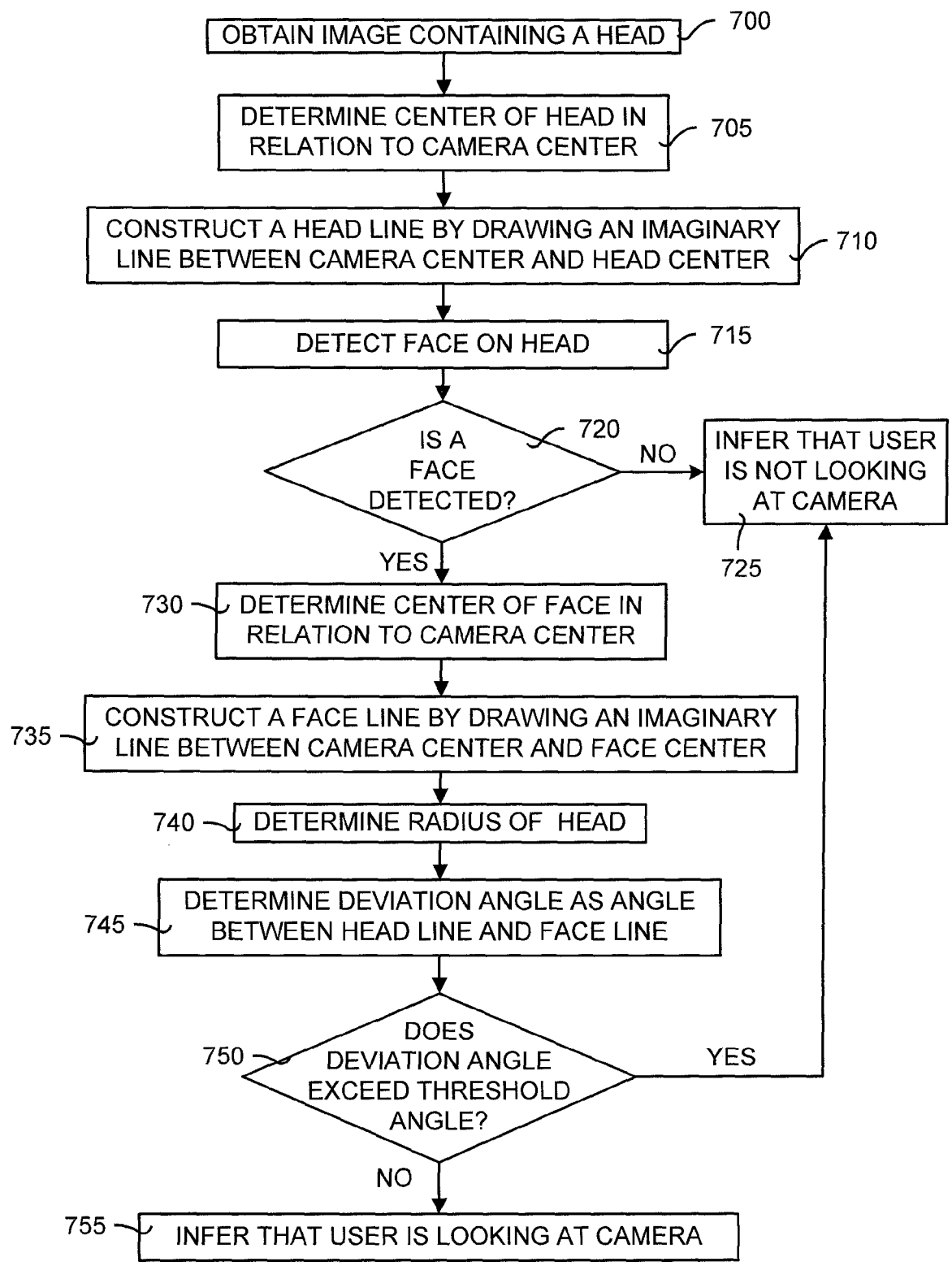
FIG. 7 is a flow diagram illustrating the operational details of the facial pose estimation method of the present invention.

FIG. 7 is a flow diagram illustrating the operational details of an attention detection system 200 using the facial pose estimation system 150 and the first comparison technique described above. In particular, the attention detection method begins by obtaining an image containing a head (box 700). Once the image is obtained, the head tracker 610 determines a center of the head in relation to a camera center (box 705). Next, a head line is constructed by drawing an imaginary line between the camera center and the head center (box 710). These steps provide information about the position of the head.

The face detection system 620 is then used to detect a face on the head (box 715). A determination is then made as to whether a face was found (box 720). If a face is not detected, then if may be inferred that the user is not looking at the camera (box 725). If a face is detected, then the face detection system 620 determines a center of the face in relation to the camera center (box 730). A face line is then constructed by drawing an imaginary line between the camera center and the face center (box 735).

The radius of the user's head is then determined (box 740). This may be done by guessing, by using the head tracker, or by asking the user to input the radius of his head. In addition, the radius of the user's head may be determined by knowing the average radius of a human head and using this knowledge to estimate the radius of the user's head. Next, a deviation angle between the head line and the face line is determined (box 745). A determination is then made as to whether the deviation exceeds a threshold angle (box 750).

If the deviation angle does exceed the threshold angle, then it may be inferred that the user is not looking at the camera (box 725). If the deviation angle does not exceed the threshold angle, then it may be inferred that the user is looking at the camera (box 755). The threshold angle depends on the distance from the user to the camera and the size of the monitor. The threshold angle may be selected empirically by an operator of the facial pose estimation system. In this working example, the threshold angle was 30 degrees. Thus, if the deviation angle was less than 30 degrees the user was considered to be looking at the camera. Alternatively, if the deviation angle was greater than 30 degrees the user was considered to be looking away from the camera.

The deviation angle may determined in at least three directions. These directions include the pitch, roll and yaw of the user's head. In this working example, the pitch of the user's head is measure about an x-axis, the roll is measured about a z-axis, and the yaw is measure about a y-axis. The facial pose estimation method detailed above may be used in any one of these directions. In this working example, only the deviation angle in the pitch and yaw directions were determined. Deviation in the roll direction tend not to have a large impact on whether the user is facing the monitor.

Figure 8A:
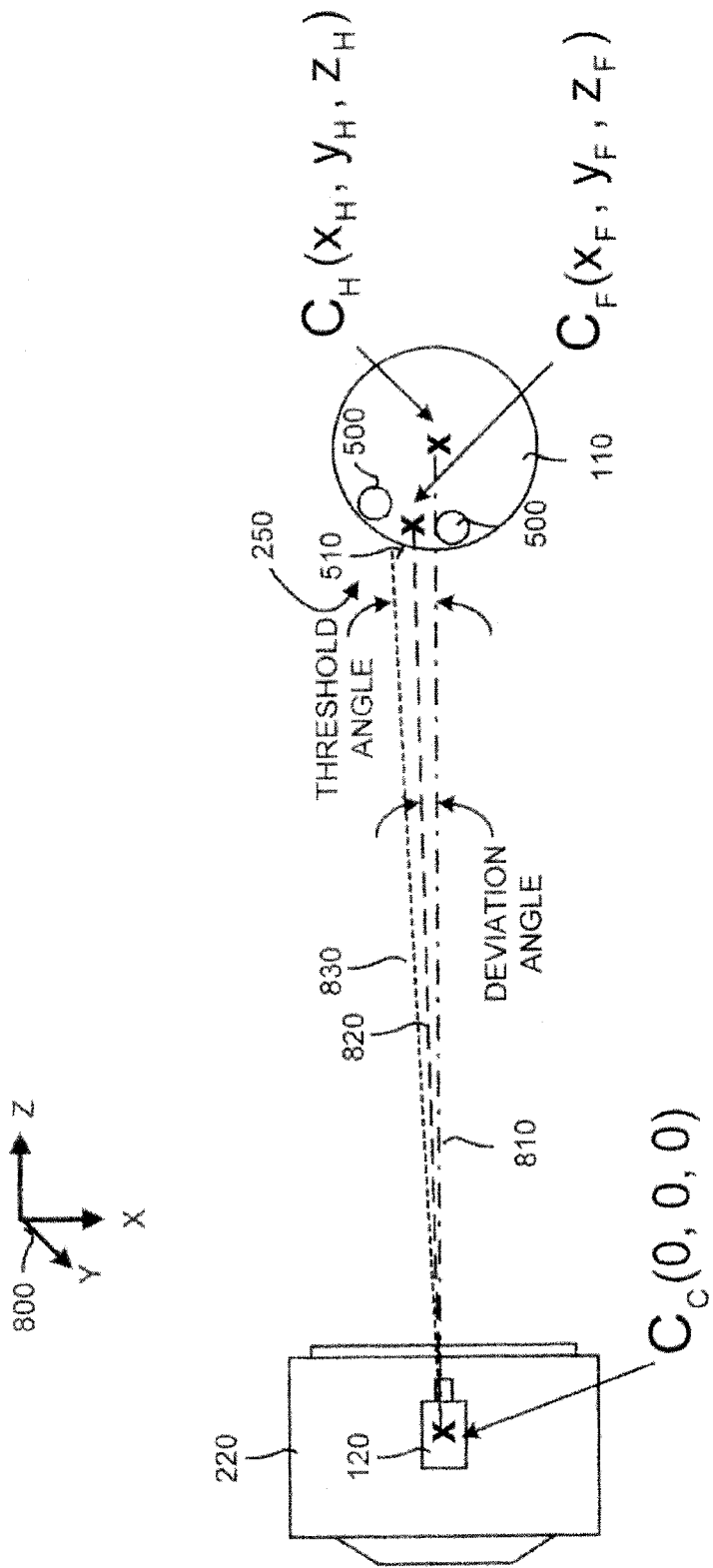
FIGS. 8A and 8B illustrate the facial pose estimation method of the present invention in the yaw direction.
Figure 8B:
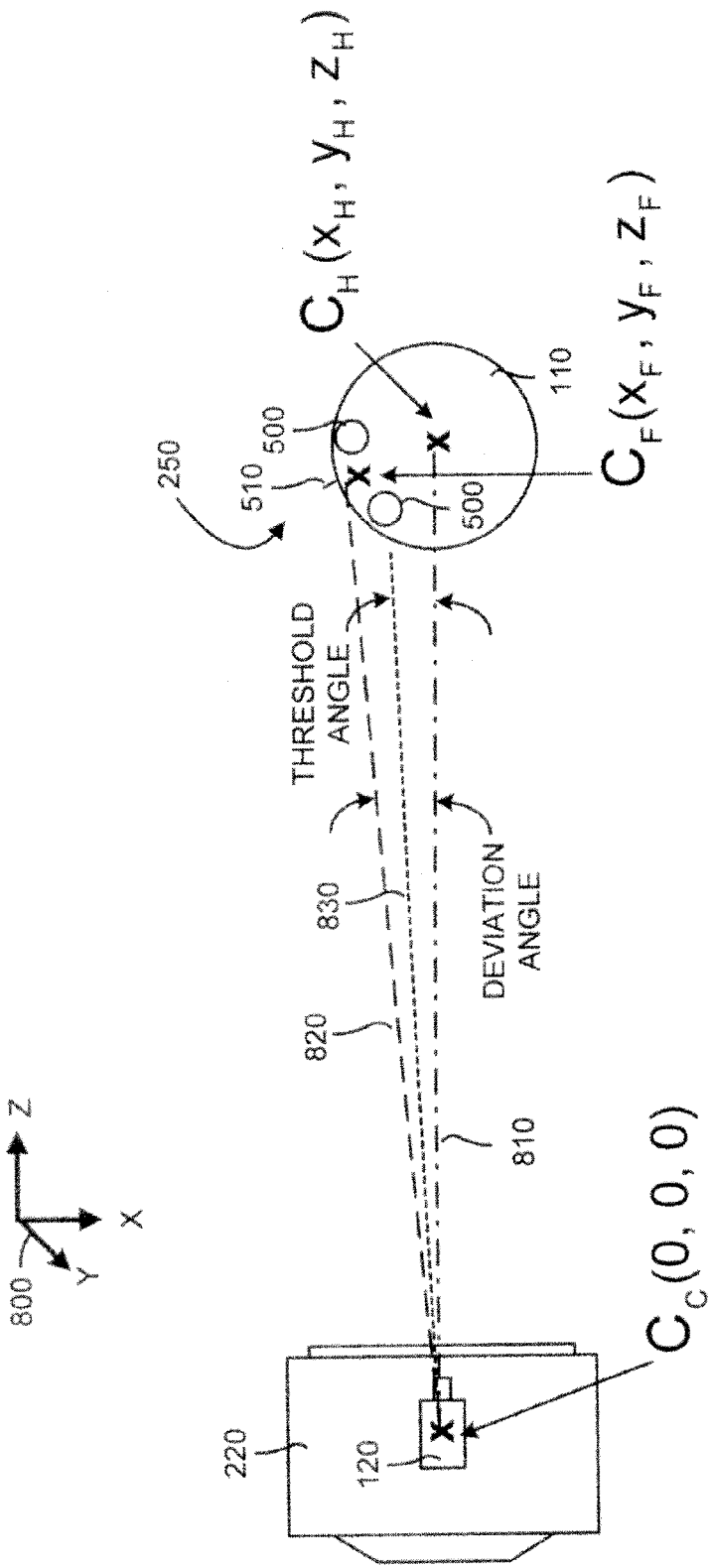

FIGS. 8A and 8B illustrate the facial pose estimation method in the yaw direction. As shown by the axes 800, the yaw direction is in the x-z plane, or a plan view of FIGS. 2A and 2B. In FIG. 8A, the yaw of the user's head is such that the user is observing the monitor 220. Conversely, in FIG. 8B, the yaw of the user's head is such that the user is not observing the monitor 220. The details of how this determination was made will now be explained.

In FIG. 8A the user's head 110 is in front of the monitor 220 that has the camera 120 located thereon. A center of the camera $C_C$ having coordinates x-y-z equals coordinates (0,0, 0) is determined. Next, a center of the head $C_H$ having coordinates ($x_H$, $y_H$, $z_H$) and a center of the face $C_F$ having coordinates ($x_F$, $y_F$, $z_F$) are found by the head tracker and the face detection system, respectively. A head line 810 is drawn from camera center $C_C$ to the head center $C_H$. Similarly, a face line 820 is drawn from camera center $C_C$ to face center $C_F$. As shown in FIG. 8A, the yaw deviation angle is the angle between the head line 810 and the face line 820 in the x-z plane. Mathematically, the yaw deviation angle is found using the equation, $$\text{Yaw} = \operatorname{asin}((x_F - x_H)/r),$$

where r is the radius of the user's head. It should be noted that this equation is an example and that there are many approximations that compute similar values for the yaw deviation angle. In addition, information different from the variables $x_F$, $x_H$ and r may be used in which case the yaw deviation would be computed differently.

The yaw deviation angle is then compared to a threshold angle. The threshold angle is visualized by drawing a threshold line 830 from the camera center $C_C$ at the threshold angle away from a camera center line (not shown) that is perpendicular to the front of the camera 120. As seen in FIG. 8A, the yaw deviation angle is less than the threshold angle. Thus, the facial pose estimation method infers that the user is observing the monitor 220.

Referring to FIG. 8B, the yaw deviation angle is greater than the threshold angle. The facial pose estimation method thus assumes that the user is not observing the monitor 220 because the user's face 250 is pointed away from the monitor 220.

Figure 9A:
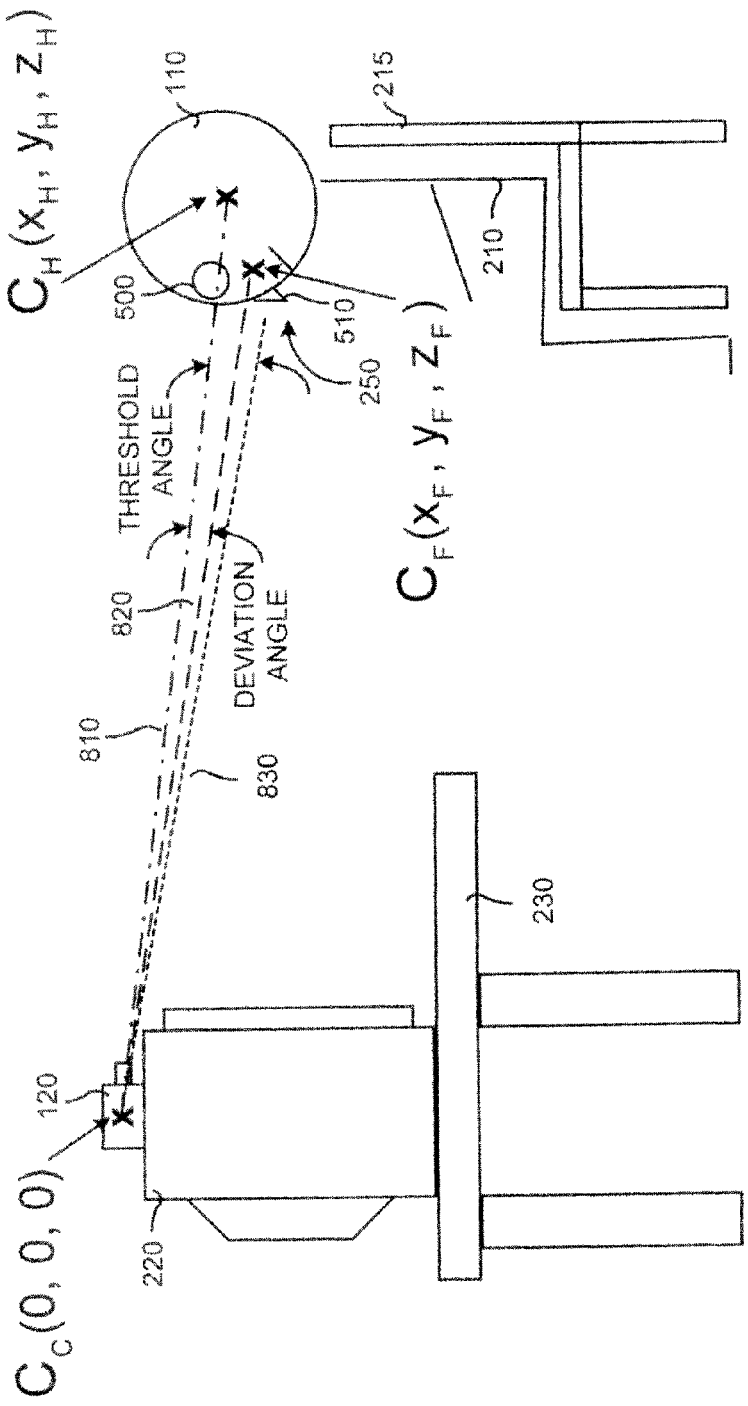
FIGS. 9A and 9B illustrate the facial pose estimation method of the present invention in the pitch direction.
Figure 9B:
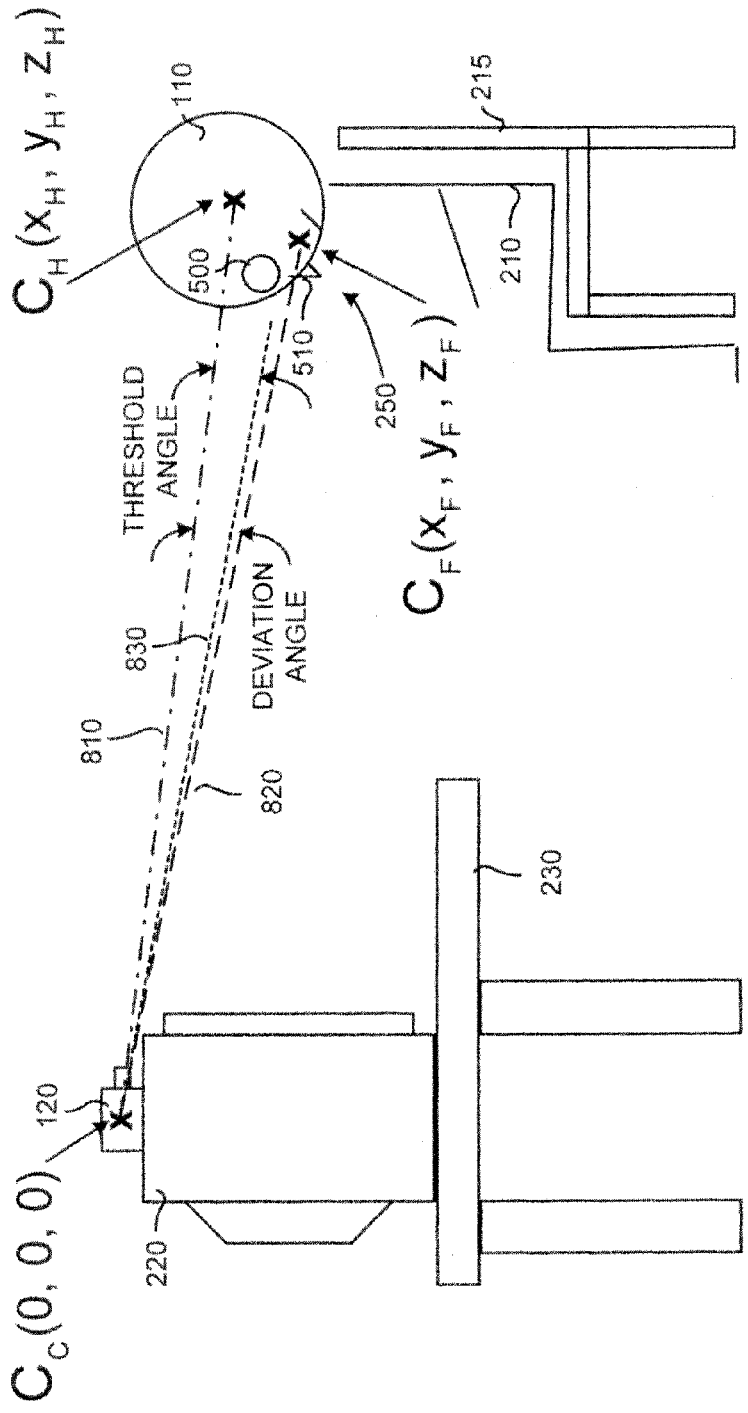

FIGS. 9A and 9B illustrate the facial pose estimation method in the pitch direction. As shown by the axes 900, the pitch direction about the x-axis in the y-z plane. This is the same view as shown in FIGS. 2A and 2B. In FIG. 9A, the pitch of the user's head 110 is such that the user 210 is observing the monitor 220. On the other hand, in FIG. 9B, the pitch of the user's head 110 is such that the user 210 is not observing the monitor 220. The details of how this determination was made will now be explained.

In FIGS. 9A and 9B, the user 210 is sitting in the chair 215 at the table 230. The table 230 contains the monitor 220 and the camera 120 mounted on top of the monitor 220. The user's head 110 includes facial features that make up the face 250 such as the eyes 500 and the nose 510.

Referring to FIG. 9A, the head center $C_H$ in x-y-z coordinates is determined by the head tracker. Similarly, the face center $C_F$ is determined by the face detection system. The head line 810 is drawn from the camera center $C_C$ to the head center $C_H$ and the face line 820 is drawn from the camera center $C_C$ to the face center $C_F$. The pitch deviation angle is the angle between the head line 810 and the face line 820 in the y-z plane. Mathematically, the pitch deviation angle is computed using the equation, $$\text{Pitch} = \operatorname{asin}((y_F - y_H)/r),$$

where r is the radius of the user's head. Once again, it should be noted that this equation is an example and that there are many approximations that compute similar values for the pitch deviation angle. In addition, information different from the variables $x_F$, $x_H$ and r may be used in which case the pitch deviation would be computed differently.

The pitch deviation angle is compared to the threshold angle. As shown in FIG. 9A, the pitch deviation angle is less than the threshold angle. Thus, the facial pose estimation method determines that the user 210 is observing the monitor 220. On the other hand, in FIG. 9B, the pitch deviation angle is greater than the threshold angle. In this situation, the method determines that the user 210 is not observing the monitor 220. This may occur, for example, when the user 210 is looking down at a book or paper in his lap.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

APPENDIX "A"

Details of the Head Tracking System and Method Used in the Working Example

I. Head Tracking Introduction and Overview

Several different types of head tracking systems and methods may be used with the present invention. In the working example presented above, a head tracking method and system that fuses results of multiple sensing modalities was used. This head tracking system and method are set forth in U.S. patent application Ser. No. 09/323,724 by Horvitz et al., filed on Jun. 1, 1999, entitled "A System and Method for Tracking Objects by Fusing Results of Multiple Sensing Modalities," now U.S. Pat. No. 6,499,025. The details of this head tracking system and method as used in this working example will now be discussed.

Figure 10:
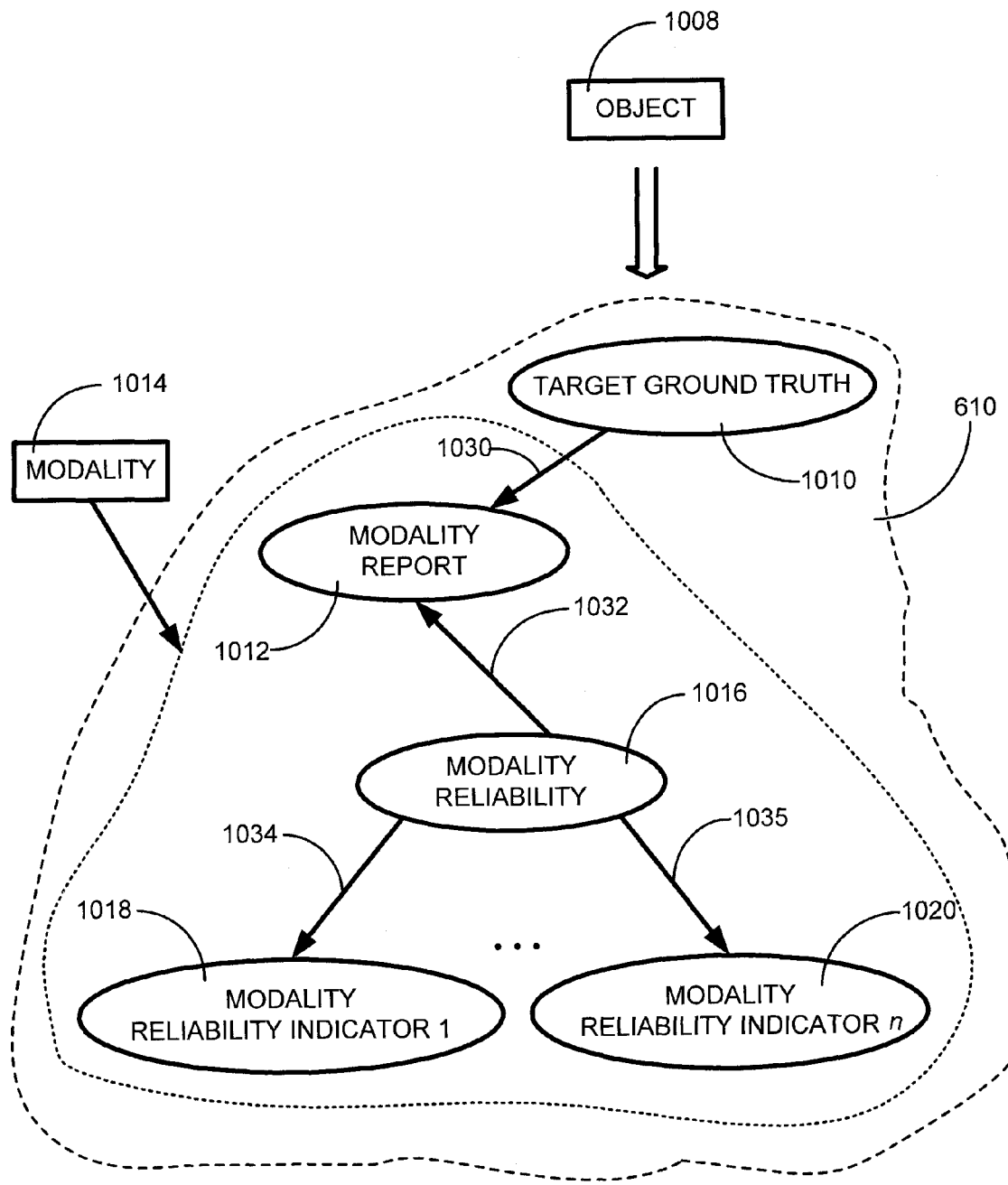
FIG. 10 is a block diagram illustrating a working example of the head tracker shown in FIG. 6.

The head tracker used in this working example is a system and method for fusing results of multiple sensing modalities to efficiently performing automated vision tracking, such as tracking human head movement and facial movement. FIG. 10 is a general block diagram illustrating an overview of the head tracker 610 of FIG. 6. The head tracker 610 robustly tracks a target object 1008 (such as a user's head 110) by inferring target data 1010, such as the state of the object 1008, including position or object coordinate information, orientation, expression, etc., conditioned on report information 1012 produced by at least one sensor modality 1014 tracking the target 1008. The head tracker 610 can be used as a vision-based tracking system for tracking objects of a digitized video scene, such as an input sequence of digital images. The input sequence can be from a live camera or from a sequence of images stored on a recording medium, such as a tape, disk, or any suitable source medium. The target data 1010 can be true state information about the target object 1008 of the image sequence. Different types of data present in the image sequence, such as color, edge, shape, and motion, can be considered different sensing modalities.

In this case, the head tracker 610 is a Bayesian network for performing Bayesian vision modality fusion for multiple sensing modalities. The Bayesian network captures the probabilistic dependencies between the true state of the object 1008 being tracked and evidence obtained from multiple tracking sensing modalities 1014. A Bayesian network is a directed acyclic graph that represents a joint probability distribution for a set of random variables. As shown in FIG. 10, the Bayesian network head tracker 610 includes nodes 1010, 1012, 1016, 1018 and 1020 that represent variables of interest or random variables. Arcs or line connectors 1030, 1032 and 1034, 1035 represent probabilistic dependencies among pairs of variables. The Bayesian network facilitates making associative and causal assertions about probabilistic influences among the variables.

The head tracker 610 constructs, learns, and performs inference with Bayesian models. This includes the use of exact and approximate algorithms for Bayesian-network inference procedures, methods that allow for the learning of conditional probabilities represented in a Bayesian model, the induction of network structure from data, and networks for reasoning over time. In addition, conceptual links between Bayesian networks and probabilistic time-series analysis tools such as hidden Markov models (HMMs) and Kalman filters can be implemented in the present invention. HMMs and Kalman filters can be represented by Bayesian networks with repetitive structure capturing prototypical patterns of independence among classes of variables.

II. Components and Operation of a Single Modality of the Head Tracker

For each sensor modality 1014, nodes 1012, 1018 and 1020 are variables that are instantiated by the sensor modality 1014 and nodes 1010 and 1016 represent inferred values. In particular, node 1010 is a target ground truth node that represents an unknown state of the target object and the goal of head tracker 610 inference.

From a Bayesian perspective, the ground-truth state influences or causes an output from the sensor modality 1014 (it should be noted that the use of term "causes" comprises both deterministic and stochastic components). This influence is indicated with arc 1030 from the ground truth node 1010 to the modality report node 1012. The modality report node 1012 is also influenced by its reliability, or its ability to accurately estimate ground-truth state, as indicated with an arc 1032 from the modality reliability node 1016 to the modality report node 1012.

Although reliabilities themselves typically are not directly observed, both reliabilities and estimates of reliabilities vary with the structure of the scene being analyzed. To build a coherent framework for fusing reports from multiple modalities, reliability can be considered as an explicit or implicit variable. From this, probabilistic submodels are built to dynamically diagnose reliability as a function of easily ascertainable static or dynamic features detected by the automated analysis of the image. As shown in FIG. 10, such evidence is represented by n modality reliability indicator nodes 1018, 1020 which are in turn influenced by the modality reliability node 1016, as indicated by the arcs 1034, 1035.

During operation for a single modality, the Bayesian model is instantiated with the modality report 1012 and reliability indicators 1018, 1020 associated with the sensor modality 1014. It should be noted that the order or frequency that the modality contributes its report is flexible. The reliability of the sensor modality 1014 is computed and the modality report 1012 is used to provide a probability distribution over the ground-truth state 1010 of the target object 1008. The Bayesian network head tracker 610 is equivalent to the following statement of conditional probabilities (for simplicity of illustration, n=1):

$$P(t,m,r,i) = P(t)P(m|t,r)P(r)P(i|r) \quad (1)$$

With this, it can be shown that, for example, the probability density for the estimate of the ground-truth state depends both upon the report as well as the reliability indicator. If t and i were independent, then:

$$P(t,i|m) = P(t|m)P(i|m).$$

However, $$P(t, i|m) = \frac{\int P(t, m, r, i) dr}{P(m)} = P(t|m) \int P(r|t, m) P(i|r) dr, \quad (2)$$

and $$P(t|m)P(i|m) = P(t|m) \int P(r|m) P(i|r) dr \quad (3)$$

Thus, in general, t and i would be independent only if P(r|m) =P(r|t, m). Similarly, however, this would only be true if P(m|t, r)=P(m|t), which may violate the assumption that the report, m is conditionally dependent on both ground-truth state, t and reliability, r.

Further, given the conditional probabilities that appear on the right hand side of Equation (1), the probability density for ground-truth state can be computed, given a report and reliability indicators:

$$P(t|m, i) = \frac{\int P(t)P(m|t, r)P(r)P(i|r) dr}{\iint P(t)P(m|t, r)P(r)P(i|r) dr dt} \quad (4)$$

III. Fusion of Multiple Modalities of the Head Tracker

Figure 11:
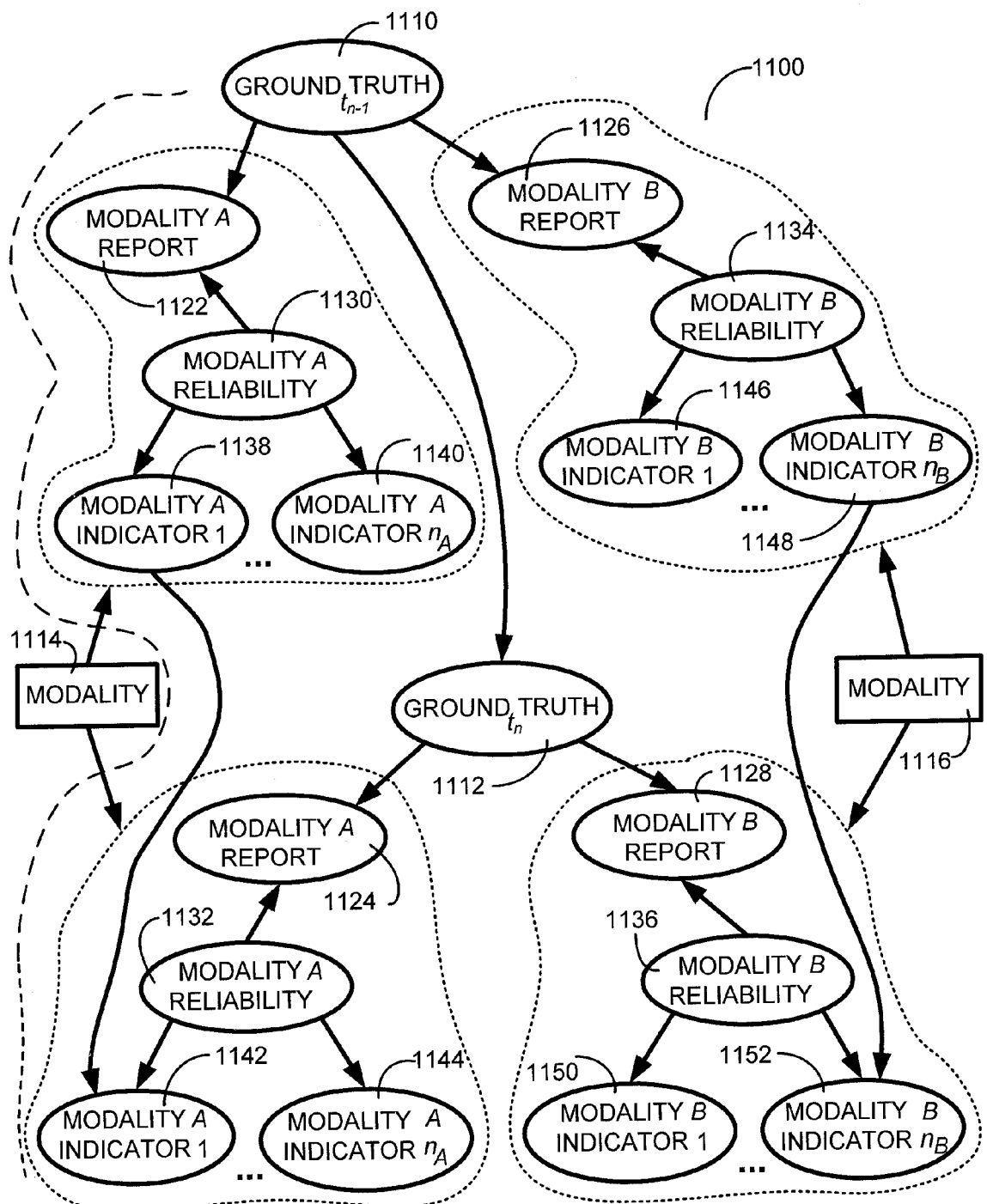
FIG. 11 is a detailed block diagram of the head tracker illustrating a temporal or dynamic Bayesian network.

In the description above for FIG. 10, a model for inferring the probability distribution over the true state of a target was considered from a report by a single modality. FIG. 11 is a detailed block diagram illustrating a temporal or dynamic network model 1100 capturing temporal dependencies among variables at adjacent points in time for integrating multiple modalities for tracking at least one object, such as an object similar to object 1008 of FIG. 10, in accordance with the present invention.

The network 1100 includes multiple ground truth states 1110, 1112 each having associated multiple modalities 1114, 1116, respectively. Each modality 1114, 1116 produces a modality report represented by nodes 1122, 1124, 1126, 1128 respectively, influenced by corresponding modality reliability nodes 1130, 1132, 1134, 1136. Evidence represented by respective 1 through n modality reliability indicator nodes 1138-1140, 1142-1144, 1146-1148, 1150-1152 is in turn caused or influenced by respective modality reliability nodes 1130, 1132, 1134, 1136.

The temporal network 1100 of FIG. 11 extends the single modality embodiment of FIG. 10 in two ways. First, the network 1100 of FIG. 11 includes subsequent ground truth states, $t_n$, and multiple modalities 1114, 1116, namely sensor modalities A and B for the subsequent ground truth states $t_n$ 1112. Each modality 1114, 1116 produces subsequent modality reports 1124, 1128 (reports A and B) influenced by respective reliability submodels 1132, 1136 (submodels A and B) for the subsequent ground truth states $t_n$ 1112. It should be noted that although two modalities and respective reports and reliabilities (A and B) are shown in FIG. 11, m different modalities can be included in a similar manner.

The model is further extended to consider temporal dynamics, as well. In the simplest approach, the reliability indicator nodes 1138 and 1140, 1142 and 1144, 1146 and 1148, 1150 and 1152 can be defined as functions of the dynamics of image features. For example, for image sequences, rapid change in global intensity values over the image could be used as an indicator variable.

In a more explicit approach, the model 1100 can be extended so that sets of variables are labeled as states at different times. Representations of Bayesian networks over time that include temporal dependencies among some subset of variables are referred to as dynamic Bayesian networks. In the model of FIG. 11, a previous true state directly influences a current true state and where prior reliability indicators influence current indicators. For example, as shown in FIG. 11, previous ground truth $t_{n-1}$ (node 1110) directly influences a current ground truth $t_n$ (node 1112) and where prior reliability indicators (nodes 1138 and 1148) influence current indicators (nodes 1142 and 1152). By modeling the integration of multiple modalities and considering the changing reliabilities of reports, a flexible filter is gained which weights previous estimates to different degrees based on estimates of their accuracy.

IV. Operation of the Head Tracker

Figure 12:
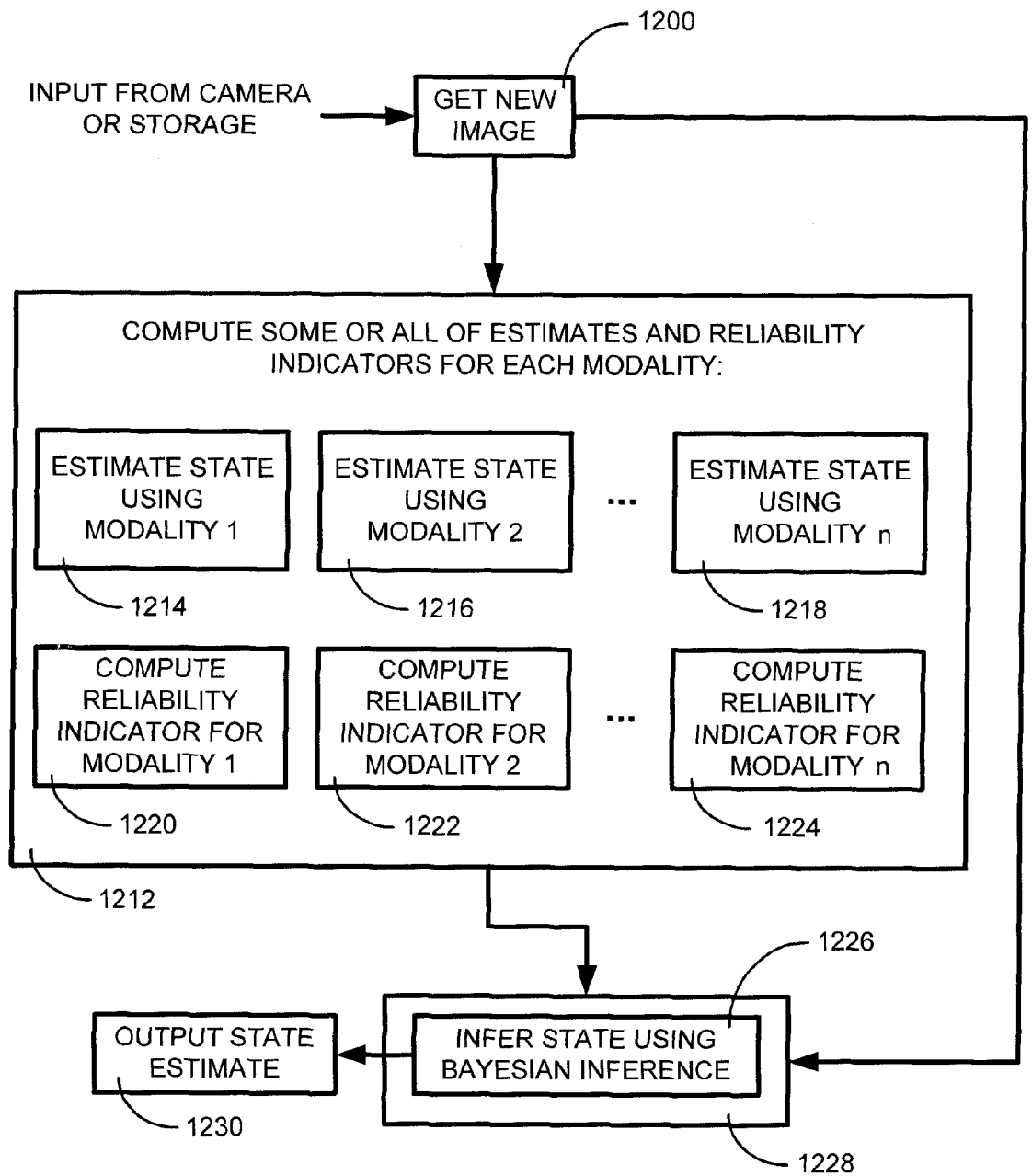
FIG. 12 is a flow diagram illustrating the general operation of the head tracker.

FIG. 12 is a block/flow diagram illustrating the general operation of the head tracker 610. In general, for video scenes and image applications, new digital image data relating to a target object is first received by the head tracker 610 from, for instance, a live camera or storage (box 1200). A modality processor 1212 comprised of multiple vision sensing modalities receives the new digital image data. The modality processor 1212 computes some or all of estimates and reliability indicators for each modality. Specifically, the modality processor 1212 can estimate states using modalities 1, 2 . . . n (boxes 1214-1218) and compute reliability indicators for modalities 1, 2 . . . n (boxes 1220-1224). Next, a sensor fusion analysis processor receives 1226 the estimate and reliability indicator computations and infers states using Bayesian inference (box 1228). Last, a state estimate is produced that is a synthesized assessment of the computations (box 1230).

Referring to FIG. 11 along with FIG. 12, during operation, the models for Bayesian modality fusion are instantiated with reports 1122-1128 and reliability indicators 1138-1152, as shown in FIG. 11. The reliability 1130-1136 of each modality is computed by the processor 1212 and the reports 1122-1128 from the modalities are integrated to provide a probability distribution over the ground-truth state of the target object.

Further, the Bayesian network of the head tracker 610 can be trained on real data to assess the probabilities of the effects of indicators on modality reports. In addition, reports could be biased based on changing information related to the modalities.

APPENDIX "B"

Details of the Face Detection System and Method Using in the Working Example

I. Face Detection Introduction and Overview

Many types of face detection systems and methods may be used with the present invention. In this working example, a face detection system and method uses a relational template over a geometric distribution of a non-intensity image property was used. This face detection system and method are set forth in U.S. patent application Ser. No. 09/430,560 by K. Toyama, filed on Oct. 29, 1999, entitled "A System and Method for Face Detection Through Geometric Distribution of a Non-Intensity Image Property," now U.S. Pat. No. 6,792,135. The details of this face detection system and method as used in this working example will now be discussed.

The face detection system and method using in this working example, preprocesses a cropped input image by resizing to some canonical image size, uses a texture template sensitive to high spatial frequencies over the resized image, averages the pixels comprising each facial feature, and outputs the results of a relational template. A face is detected if the output from the relational template is greater than an empirically determined threshold. In this working example, the non-intensity image property used is edge density, which is independent of both person and illumination. The face detection system and method was used first on an entire raw image (so that the cropped image was defined as the entire raw image). Next, smaller sub-regions were defined and searched using the face detection system and method. These sub-regions were defined for a limited range of scales that included only those scales on which a face would be located if the user was sitting in front of a desktop computer. The face detection method, however was performed over the entire image, for every hypothesized rectangle in which a face could appear.

Figure 13:
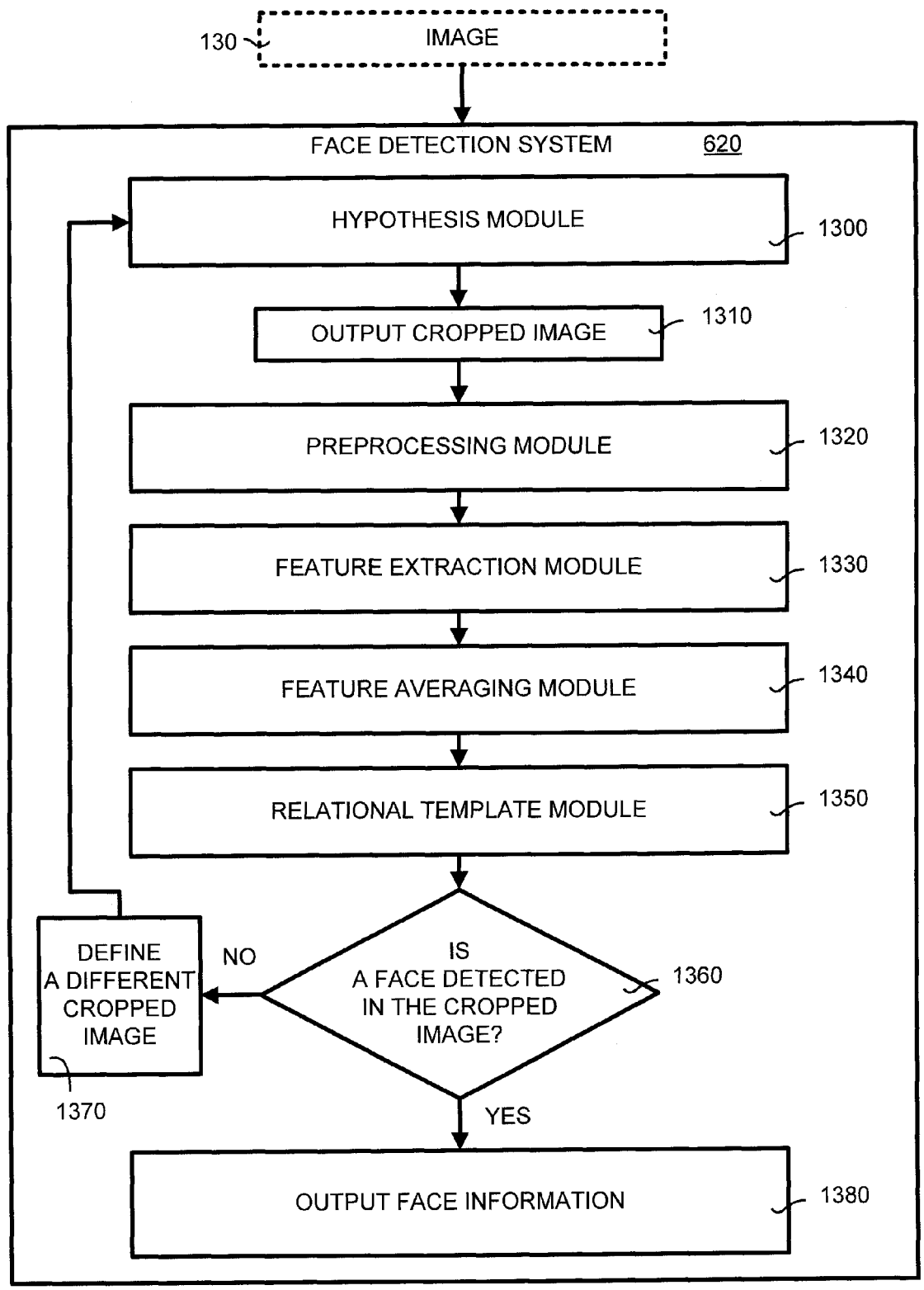
FIG. 13 is a general block-flow diagram illustrating the face detection system shown in FIG. 6.
Figure 14:
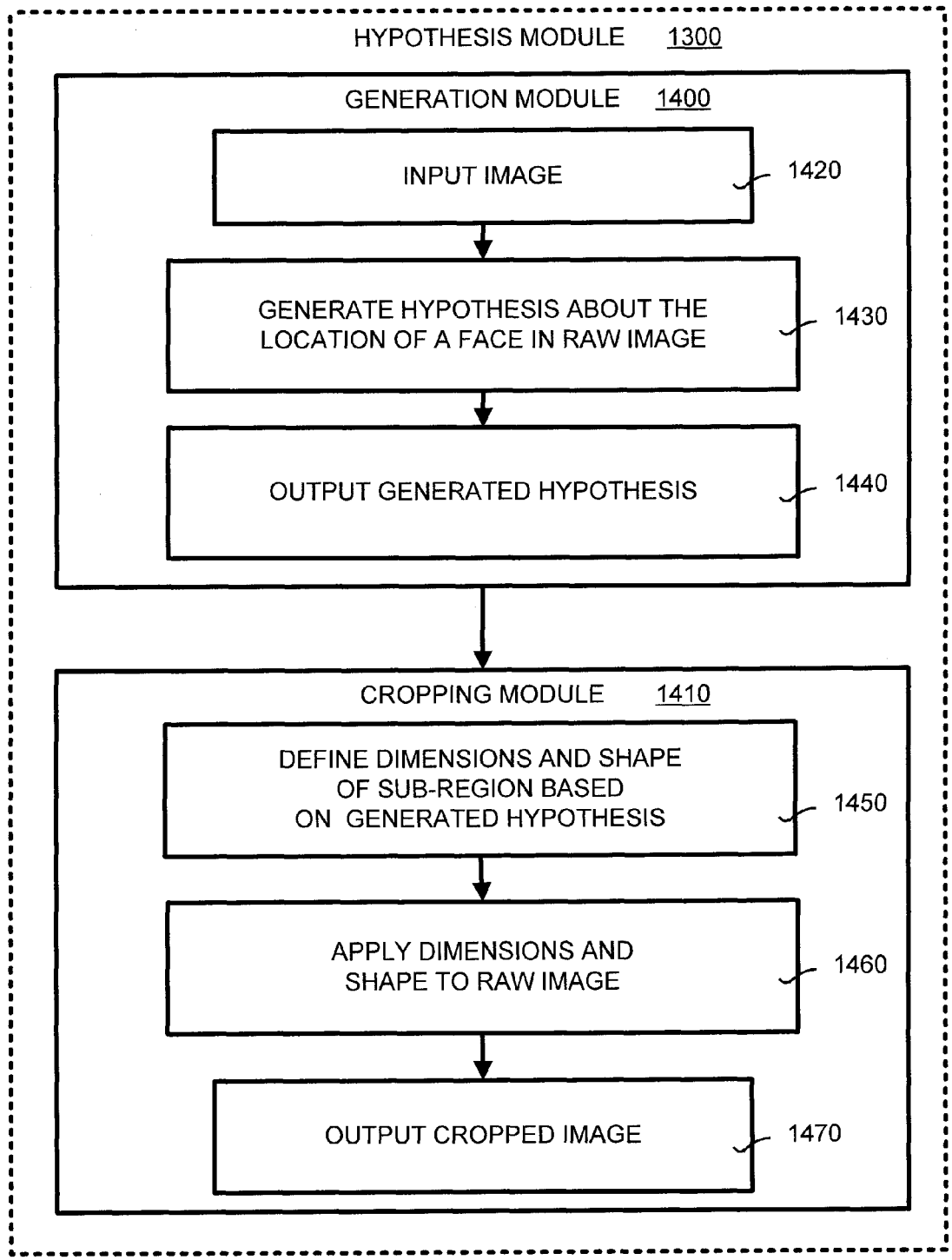
FIG. 14 is a detailed block diagram illustrating the hypothesis module of the face detection system shown in FIG. 13.

FIG. 13 is a general block-flow diagram illustrating the face detection system 620 shown in FIG. 6. Generally, the face detection system 620 of inputs an image to be examined, determines a sub-region of the image to examine, performs preprocessing on the sub-region, performs feature extraction based on image property and uses a relational template to determine if a face is present in the sub-region. The image 130 is received by the face detection system 620 and sent to a hypothesis module 1300 that generates a hypothesis and defines the dimensions of a sub-region in the image 130 (or cropped image) where a face may be found. The cropped image is sent as output (box 1310) to a preprocessing module 1320, which prepares the image 130 for further processing. The preprocessed cropped image is then sent to a feature extraction module 1330.

The feature extraction module 1330 extracts any facial features present in the preprocessed cropped image by using a feature template based on an image property. Further, image features values are obtained by the feature extraction module 1330 and sent to a feature averaging module 1340. The feature averaging module 1340 determines a number of facial regions, places the image features values into a facial regions and determines a combined image feature value for each facial region. The combined values are then sent to a relational template module 1350 that builds a relational table and determines a relational value based on each region's combined image feature value.

Based on a comparison between the relational value and a threshold value, the face detection system 620 determines whether a face has been detected in the cropped image (box 1360). If not, then a face is not within in the sub-region that was examined and a different sub-region needs to be generated (box 1370). This occurs by returning to the hypothesis module 1300 where a different hypothesis is generated about where a face may be located within the image 130. In addition, based on the hypothesis generated a different cropped image is defined for examination as described previously. If a face is detected in the cropped image then face information is sent as output (box 1380). Face information includes, for example, an image of the face, the location of the face within the image 130, and the location and dimensions of the cropped image where the face was found.

II. Face Detection System and Operational Details

FIG. 13 is a detailed block diagram illustrating the hypothesis module of the face detection system 620 shown in FIGS. 6 and 13. Generally, the hypothesis module 1300 generates an assumption as to the location of a face within the image 130 and defines the dimensions of a sub-region (within the image 130) in which to look for a face. The hypothesis module 1300 includes a generation module 1400, for generating a hypothesis about where a face may be located, and a cropping module 1410, for defining a sub-region to examine.

The generation module 1400 receives the image 130 (box 1420) and generates a hypothesis about the location of a face within the image 130 (box 1430). The hypothesis may include, for example, information about which image scales, aspect ratios and locations to examine. In one aspect of the face detection method, hypotheses are generated that include rectangular sub-regions of the image within a range of scales and at all possible image locations. Other aspects of the invention include hypothesis generation that may include other types of vision processing that target regions of the image most likely to contain a face (such as regions of the image that contain skin color or ellipse-shaped blobs). The generated hypothesis is then sent as output (box 1440) to the cropping module 1410.

The cropping module 1410 then defines the dimensions and shape of a sub-region (or cropped image) based on the generated hypothesis (box 1450). The dimensions and shape are applied to the image 130 (box 1460) and a cropped image is sent as output (box 1470). It should be noted that the dimensions of the sub-region range between a small percentage of the image 130 to the entire image 130. Further, in one aspect of the invention, the shape of the sub-region is rectangular. Other aspects of the invention include sub-regions that may be any suitable shape that facilitates detection of a face within the sub-region (such as oval, circular or square). In some embodiments, once the dimensions and shape of the sub-region are defined, the entire image 130 is searched by cycling each sub-region through the face detection system 620. Examination of each sub-region may occur one sub-region at a time or, if multiple processors are available, concurrent examination may be performed.

Figure 15:
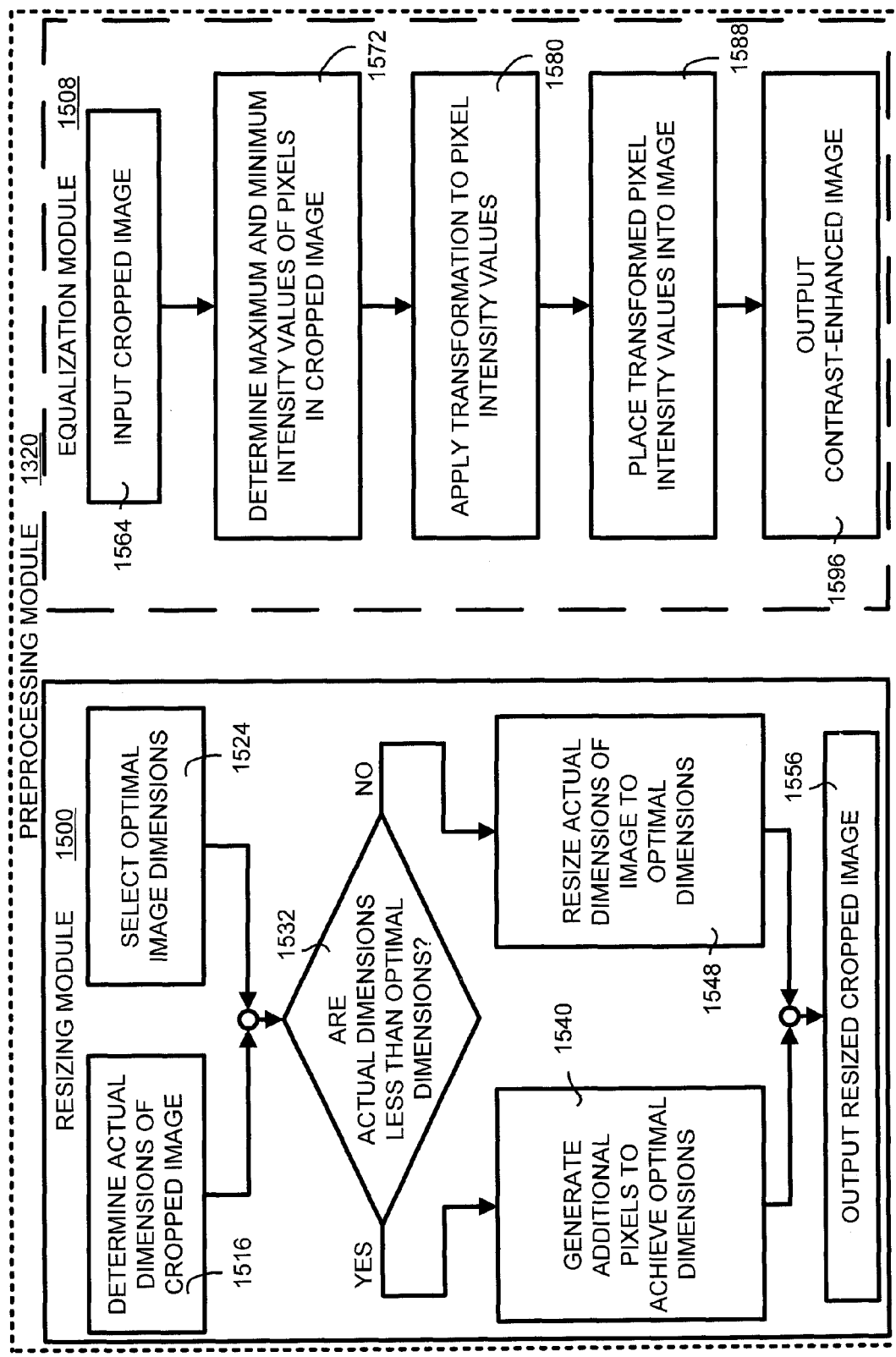
FIG. 15 is a detailed block diagram illustrating the preprocessing module of the face detection system shown in FIG. 13.

FIG. 15 is a detailed block diagram illustrating the preprocessing module 1320 of the face detection system 620. The preprocessing module 1320 receives the cropped image that may contain a face and performs various types of preprocessing. This preprocessing includes resizing the image, masking the image to filter out unwanted background noise, performing histogram equalization on the image, or any other type of preprocessing that will enhance the raw image for further processing by the face detection system 620.

In general, the preprocessing module 1320 can include several types of modules for performing the preprocessing listed above. In a some embodiments, the preprocessing module includes a resizing module 1500 for resizing the cropped image. Moreover, an equalization module 1508 for increasing image contrast may optionally be included in some embodiments (as shown by the large dashed line around the equalization module 1508 in FIG. 15). It should be noted that processing of the cropped image by these modules may occur in any suitable order. In the following description, however, the resizing module 1500 is discussed first.

The resizing module 1500 resizes the cropped image to an optimal (or canonical) size using such methods as, for example, smoothing, downsampling and pixel interpolation. This resizing reduces the effects of image resolution and scale that can substantially change qualities of an image. The resizing module 1500 shown in FIG. 15 uses pixel interpolation, but it should be understood that any other suitable method of resizing an image (such as those listed above) may be used. In one aspect of the invention, the resizing module 1500 begins processing a cropped image by determining the actual dimensions (such as horizontal and vertical) of the image (box 1516). In addition, a set of optimal dimensions for the image is selected (box 1524). A comparison then is made to determine whether the actual dimensions are less than the optimal dimensions (box 1532). If the actual dimensions are less, then additional pixels are generated and added to the actual dimensions to achieve the optimal dimensions (box 1540). One aspect of the invention includes generating additional pixels using linear (if one dimension is too small) or bilinear (if both dimensions are too small) interpolation. If the actual dimensions are greater than the optimal dimensions, then the actual dimensions are resized to achieve the optimal dimensions (box 1548). In some embodiments, this resizing is performed using Gaussian smoothing and downsampling. A resized image having optimal dimensions is then sent as output (box 1556).

The optional equalization module 1508 receives the cropped image (box 1564) and determines a maximum and a minimum of each pixel's intensity value within the cropped image (box 1572). A transformation is applied to the intensity value of each pixel (box 1580) and the transformed pixel intensity values placed back into the image (box 1588). In some embodiments, this transform is a histogram equalization that applies a linear transformation on each pixel intensity value in the image, such that the resulting image spans the full range of grayscale values. For example, each pixel value p is transformed to $p'=ap+b$, where a and b are chosen so that one of the pixels assumes the maximum possible grayscale value while another pixel assumes the minimum value, and all others fall in between. The values for a and b are held constant for any given input image. After all pixels are transformed, the resulting contrast-enhanced image is sent as output (box 1596).

Figure 16:
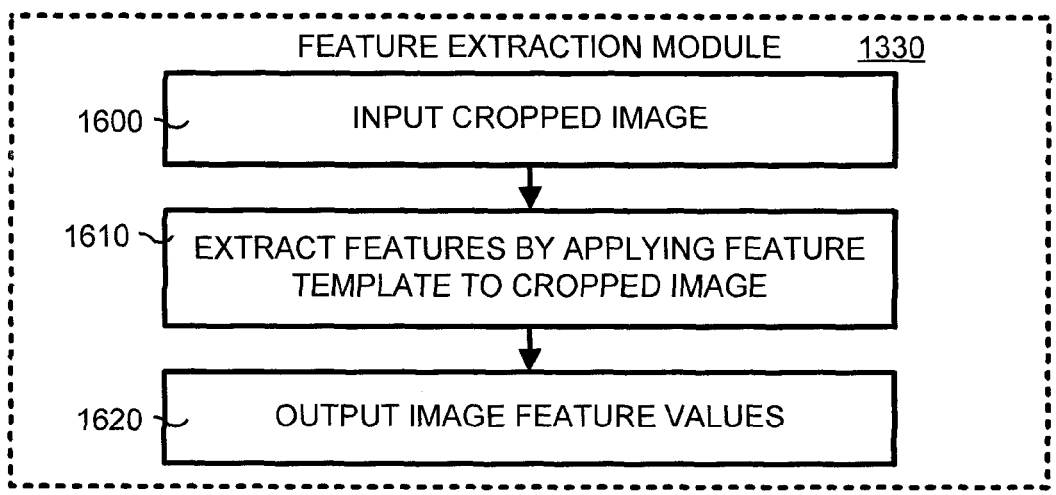
FIG. 16 is a detailed block diagram illustrating the feature extraction module of the face detection system shown in FIG. 13.

FIG. 16 is a detailed block diagram illustrating the feature extraction module 1330 of the face detection system 620. The feature extraction module 1330 uses a non-intensity image property to detect local features present in the image. The non-intensity image property is used in a feature template that in some embodiments is sensitive to high spatial frequencies. A cropped image is received as input (box 1600) and, for each pixel within the cropped image, image feature values based on the non-intensity image property are extracted (box 1610) and sent as output (box 1620). The image feature values are extracted by using the feature template to determine the degree of high-frequency variation that occurs around each pixel. In this working example, the image property is edge density. Edge density is the amount of local high-frequency texture within an area of the face. For example, high edge density is normally found around the eyes, where facial features such as the limbus, the eyelids and the eyelashes project several edges onto the image. In contrast, areas of the face such as the cheeks contain few edges and thus have low edge density. This low edge density occurs whether the cheeks are smooth shaven or covered by facial hair.

One aspect of the invention includes using convolution to convolve the preprocessed image with at least one feature template based on edge density (known as a texture template). The output of the convolution is high in areas where there are many edges and low in areas where there are not. In some embodiments, edge detection is performed using an edge mask (such as a 1, 0, −1 edge mask) applied both horizontally and vertically. For each pixel, the extracted information includes a maximum value of the absolute values of each respective convolution. Alternatively, other means of extracting image property information from an image (i.e. feature templates) other than convolution may be used, such as, for example, Laplacians, Gabor wavelets, and any other types of filters than can act as detectors of high-frequency components in an image.

Figure 17:
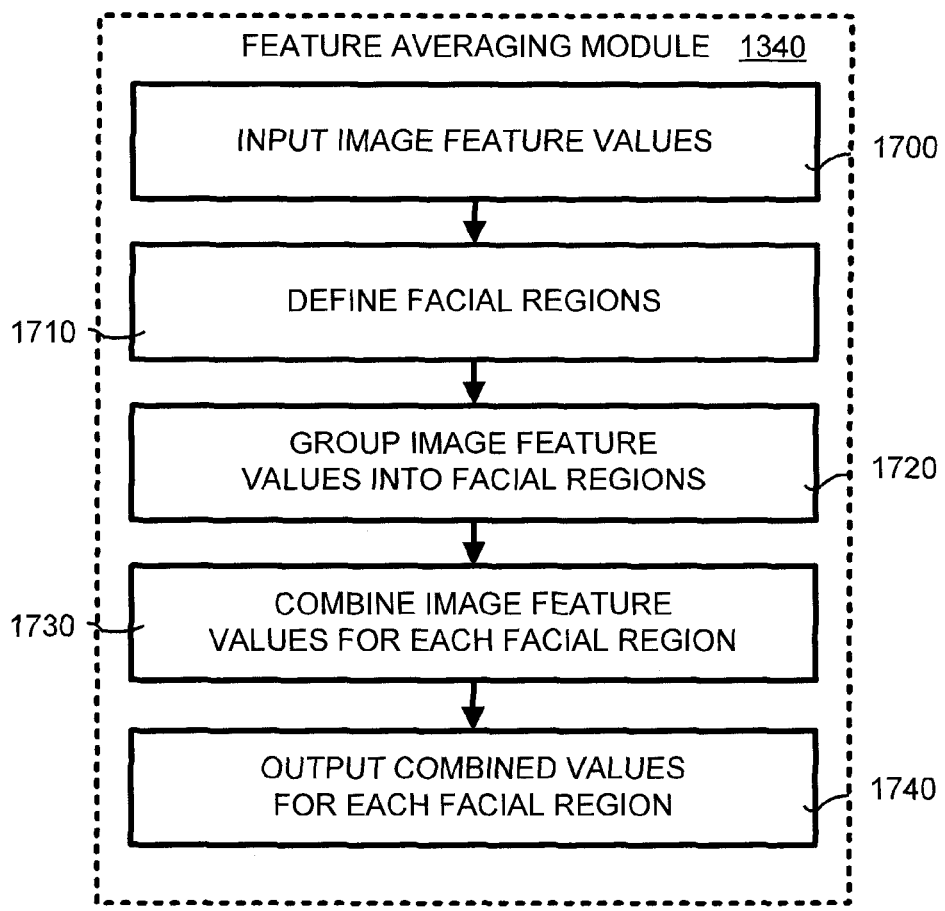
FIG. 17 is a detailed block diagram illustrating the feature averaging module shown in FIG. 13.

FIG. 17 is a detailed block diagram illustrating the feature averaging module 1340 shown in FIG. 13. The feature averaging module 1340 defines facial regions and combines (e.g., averages or otherwise aggregates and summarizes) the image feature values within each facial region. In some embodiments, each facial region corresponds to a feature on a face and the facial regions are geometrically distributed in a facial arrangement (i.e. according to how features of a face are arranged). For example, a forehead region would be above a right eye region and a left eye region and a mouth region would be below a nose region. In addition, the number of facial regions can be any number including one or greater. For example, in one embodiment the number of facial features is seven, corresponding to forehead, right eye, left eye, right cheek, left cheek, nose and mouth regions.

The feature averaging module 1340 inputs the image feature values (box 1700) and defines facial regions (box 1710). The image feature values are then grouped into corresponding facial regions (box 1720) and all of the image property values for each facial region are combined (box 1730). In some embodiments, the image property values for each facial region are averaged. For instance, if the image property is edge density and there are eighteen pixels within a right eye region, that region might be represented by an average texturedness value of the eighteen pixels. A combined image feature value for each facial region is sent as output (box 1740).

Figure 18:
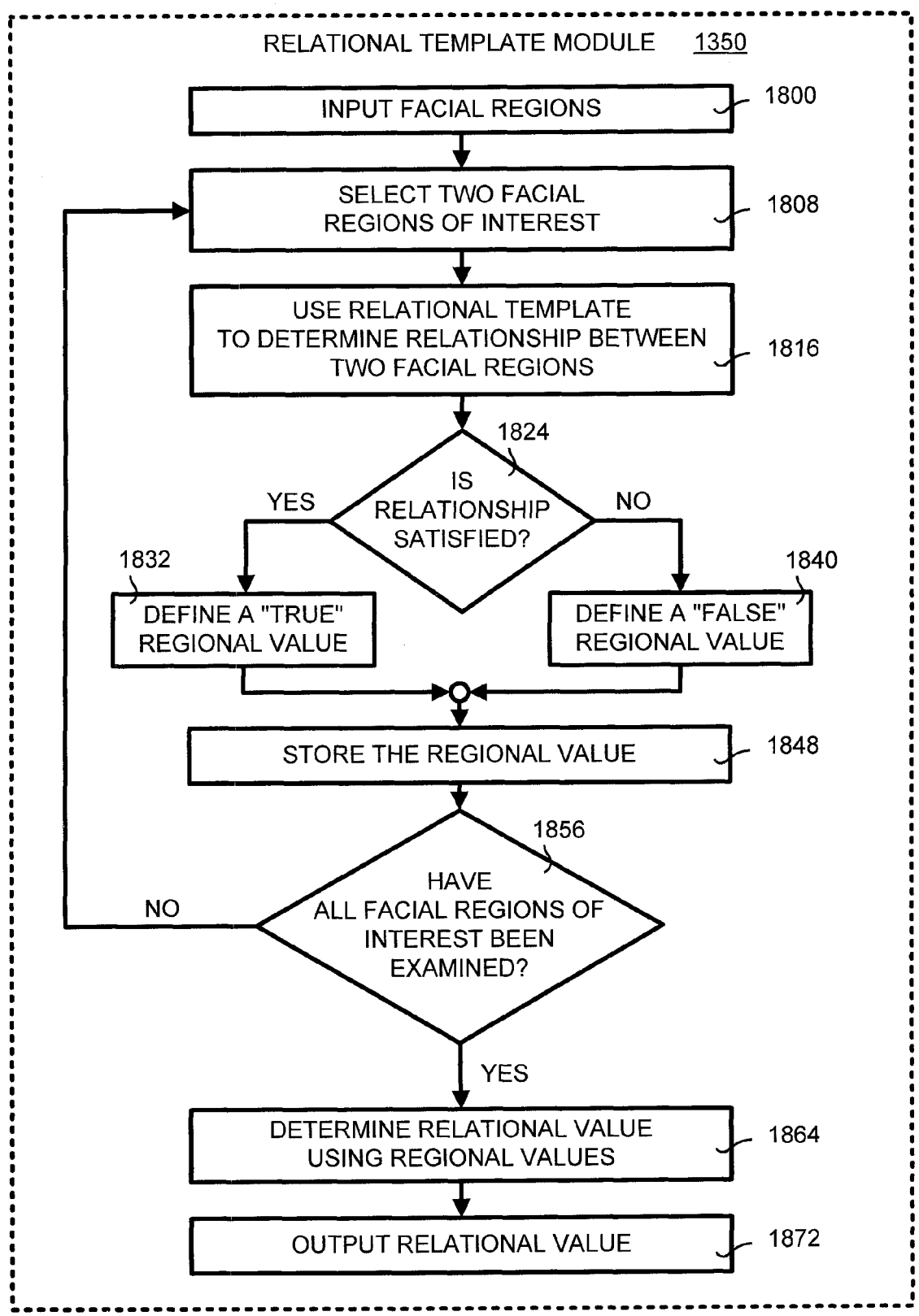
FIG. 18 is a detailed block diagram illustrating the relational template module shown in FIG. 13.

FIG. 18 is a detailed block diagram illustrating the relational template module 1350 shown in FIG. 13. In general, the relational template module 1350 determines the relationship between any two facial regions and assigns a regional value based on that relationship. Regional values are then summed to yield a relational value and, if the relational value is greater than a threshold, a face has been detected. Specifically, the relational template module 1350 inputs the facial regions and combined image feature values (box 1800) from the feature averaging module 1340. Two facial regions of interest are selected (box 1808) and, using a relational template, a relationship is determined between the two facial regions (box 1816). The relational template is generally a matrix that is fixed throughout the face detection operation. The relational template module 1350 then determines whether the relationship between the two facial regions is satisfied (box 1824). For instance, a relationship may be that a forehead region must have a lower edge density than a left eye region.

If the relationship is satisfied, a "true" regional value is defined (box 1832); otherwise, a "false" regional value is defined (box 1840). By way of example, if the forehead region has a lower edge density than the left eye region the relationship is satisfied and the regional value would be +1 (or "true"). Otherwise, the regional value would be −1 (or "false"). The regional value associated with the relationship between the two facial regions is then stored (box 1848). The relational template module 1350 then determines whether all of the facial regions of interest have been examined (box 1856). If all the regions have not been examined, the relationship between two different facial regions is examined. Otherwise, a relational value is determined using the stored regional values (box 1864). In some embodiments, the relational value is determined by summing the regional values. For example, if five relationships are satisfied (+1*5=5) and two relationships are not satisfied (−1*2=−2) the relational value would be equal to three (5+(−2)=3).

The relational value is sent as output (box 1872) to be compared to a threshold value (see FIG. 13). If the relational value is greater than a certain empirically-determined threshold value then a face has been detected within the image. In particular, a face is detected if:

$$\sum_{i,j} sgn(I_i - I_j)t_{ij} > y$$

where $sgn(I_i-I_j)$ returns a +1, 0, or −1 depending on the sign of its argument, y is a threshold determined empirically, and the sum is taken over all possible values of i and j where i<j. In addition, any type of postprocessing directed at improving speed and eliminating redundancies may be performed on the face image at this point. For example, if two faces are detected and overlap by more than a certain amount then post processing would determine that the two overlapping faces were really one face and merge the two faces into one.

What is claimed is:

1. An attention detection system for determining whether a computer application should execute an action, comprising:
   an image captured by a camera that contains the user's head and face;
   a display device for providing visual information to the user;
   a yaw center line defined as a line in an x-z yaw plane that bisects the user's head into two approximately equal parts;
   a deviation angle that indicates an angle between a center of the camera and a center of the user's face;
   a threshold angle that is compared to the deviation angle to determine whether the user is facing the display device; and
   a facial pose estimation system that processes the image and uses the threshold angle to determine whether a user is gazing at the display device and instructs the computer application whether to execute an action based on the determination.

2. The attention detection system of claim 1, further comprising a head tracker that tracks a head position of the user's head in the image.

3. The attention detection system of claim 2, further comprising a face detection system that detects a face position of the user's face in the image.

4. The attention detection system of claim 3, further comprising a position comparator that receives the head position and the face position and determines a facial pose of the user by comparing the head and face positions.

5. The attention detection system of claim 1, wherein the deviation angle is in an x-z yaw plane that indicates a yaw angle between the center of the camera and the center of the user's face.

6. The attention detection system of claim 5, wherein the threshold angle is in the x-z yaw plane.

7. The attention detection system of claim 1, wherein the deviation angle is in a y-z pitch plane that indicates a pitch angle between the center of the camera and the center of the user's face.

8. The attention detection system of claim 7, wherein the threshold angle is in the y-z pitch plane.

9. The attention detection system of claim 1, further comprising:
a center of the user's face in the x-z yaw plane; and
a yaw deviation corresponding to a pixel distance between the yaw center line and the center of the user's face in the x-z yaw plane.

10. The attention detection system of claim 9, further comprising a yaw threshold that is compared to the yaw deviation to determine whether the user is facing the display device and, if so, then instructs the computer application to execute the action.

11. A computer-implemented attention detection system for determining where a user's attention is focused, comprising:
at least one monitor that provides the user with visual information;
a camera disposed on the monitor that captures images of the user including a head of the user;
a yaw center line defined as a line in an x-z yaw plane that bisects the user's head into two approximately equal parts;
a deviation angle that indicates an angle between a center of the camera and the yaw center line;
a threshold angle that is compared to the deviation angle to determine the facial pose information; and
a facial pose estimation system that receives and uses the captured images and yaw center line to output the facial pose information containing an estimate of a facial pose of the user to determine where the user's attention is focused.

12. The computer-implemented attention detection system as set forth in claim 11, further comprising a screen saver application in communication with the monitor that receives the facial pose information and uses the information to decide whether to start and terminate the screen saver application on the monitor.

13. The computer-implemented attention detection system as set forth in claim 11, further comprising a plurality monitors and a monitor application that uses the facial pose information to determine which of the plurality of monitors the user is observing.

14. The computer-implemented attention detection system as set forth in claim 11, further comprising an instant messaging application that receives the facial pose information and uses the information to decide whether to display a message to the user on the monitor.

15. The computer-implemented attention detection system as set forth in claim 11, wherein the deviation angle is in the x-z yaw plane and indicates a yaw angle between a center of the camera and the yaw center line.

16. The computer-implemented attention detection system as set forth in claim 15, wherein the threshold angle is in the x-z yaw plane.

17. A computer-implemented method for determining where a user's attention is focused in relation to a computer display device, comprising:
capturing an image of the user's head and face using a camera;
calculating a centroid of the user's head and a centroid of the user's face;
computing a deviation angle using the centroid of the user's head and the centroid of the user's face;
comparing the deviation angle and a threshold angle using the computer to determine where the user's attention is focused in relative to a computer display device; and
instructing a computer application whether to execute an action based on where the user's attention is focused.

18. The computer-implemented method as set forth in claim 17, wherein comparing further comprises:
calculating the deviation angle as a deviation between the centroid of the user's face and the centroid of the user's head.

19. The computer-implemented method as set forth in claim 18, further comprising:
determining that deviation angle is greater than the threshold angle and that the user's attention is not focused on the computer display device; and
causing the computer application to perform background computation while the user's attention is not focused on the computer display device.

20. The computer-implemented method as set forth in claim 18, further comprising:
determining that deviation angle is less than the threshold angle and that the user's attention is focused on the computer display device; and
causing the computer application to display a message to the user on the computer display device.

* * * * *